US012401502B2

(12) United States Patent
Wang et al.

(10) Patent No.: US 12,401,502 B2
(45) Date of Patent: Aug. 26, 2025

(54) FLEXIBLE CONTENT SELECTION PROCESSES USING SECURE MULTI-PARTY COMPUTATION

(71) Applicant: GOOGLE LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 17/919,566

(22) PCT Filed: Mar. 7, 2022

(86) PCT No.: PCT/US2022/019171
§ 371 (c)(1),
(2) Date: Oct. 18, 2022

(87) PCT Pub. No.: WO2022/192148
PCT Pub. Date: Sep. 15, 2022

(65) Prior Publication Data
US 2023/0171091 A1    Jun. 1, 2023

(30) Foreign Application Priority Data
Mar. 8, 2021   (IL) .......................................... 281328

(51) Int. Cl.
*H04L 9/08* (2006.01)
(52) U.S. Cl.
CPC ........ *H04L 9/085* (2013.01); *H04L 2209/466* (2013.01)
(58) Field of Classification Search
CPC ........................... H04L 9/085; H04L 2209/466
See application file for complete search history.

(56) References Cited

U.S. PATENT DOCUMENTS 9,577,829 B1 * 2/2017 Roth ....................... G06F 21/60
9,679,314 B1   6/2017 Wang
(Continued)

FOREIGN PATENT DOCUMENTS

CN    106209366    12/2016
CN    109359957    2/2019
(Continued)

OTHER PUBLICATIONS

Office Action in Israel Appln. No. 281329, dated Jun. 27, 2023, 3 pages.
(Continued)

*Primary Examiner* — Rupal Dharia
*Assistant Examiner* — Devin E Almeida
(74) *Attorney, Agent, or Firm* — Fish & Richardson P.C.

(57) ABSTRACT

This document relates to using secure MPC to select digital components in ways that preserve user privacy and protects the security of data of each party that is involved in the selection process. In one aspect, a method includes receiving, by a first server of a secure MPC system from a client device, a digital component request. The first server identifies, for each digital component in a set, a selection value and a priority tier. For each tier, the first server determines, using a secure MPC process in collaboration with one or more second servers of the secure MPC system, a first secret share of a winner parameter for each digital component in the priority tier. The first server identifies a highest tier for which a given digital component has a winner parameter that indicates that the given digital component is a winning digital component.

20 Claims, 10 Drawing Sheets

(56) References Cited

U.S. PATENT DOCUMENTS

| | | | |
|---|---|---|---|
| 10,635,824 B1* | 4/2020 | Triandopoulos | G06F 21/602 |
| 11,023,595 B1* | 6/2021 | Allen | G06F 16/248 |
| 2017/0264531 A1* | 9/2017 | Mahyar | G06N 7/01 |
| 2018/0109612 A1 | 4/2018 | Zhong et al. | |
| 2019/0205568 A1* | 7/2019 | Veugen | H04L 9/008 |
| 2019/0311138 A1* | 10/2019 | Harris | G06F 21/6245 |
| 2020/0126143 A1 | 4/2020 | Chen et al. | |
| 2021/0067315 A1 | 3/2021 | Mitchell et al. | |
| 2021/0203492 A1* | 7/2021 | Soares de Resende | H04L 67/125 |
| 2021/0406386 A1* | 12/2021 | Ortiz | G06N 20/00 |
| 2024/0022392 A1 | 1/2024 | Wang et al. | |

FOREIGN PATENT DOCUMENTS

| | | |
|---|---|---|
| JP | 2000-057157 | 2/2000 |
| JP | 2008-518570 | 5/2008 |
| JP | 2010-146269 | 7/2010 |
| JP | 2011-519080 | 6/2011 |
| JP | 2012-033088 | 2/2012 |
| JP | 2014-534546 | 12/2014 |
| JP | 2015-532737 | 11/2015 |
| JP | 2016-510912 | 4/2016 |
| JP | 2019-527427 | 9/2019 |
| WO | WO 2018135334 | 7/2018 |
| WO | WO 2019063503 | 4/2019 |
| WO | WO 2020159591 | 8/2020 |

OTHER PUBLICATIONS

Office Action in Israel Appln. No. 281328, mailed on Aug. 9, 2023, 4 pages.
Notice of Allowance in Japanese Appln. No. 2022-556203, mailed on Dec. 25, 2023, 5 pages (with English translation).
Notice of Allowance in Japanese Appln. No. 2022-570376, mailed on Jan. 22, 2024, 5 pages (with English translation).
Office Action in Japanese Appln. No. 2022-556203, mailed on Nov. 27, 2023, 4 pages (with English translation).
Takashi Nishide others—the [ with the structure of an automatic tie breaker ]—a M+ univalent rank code auction system and 2014 Code, collection [ of information security symposium summaries ], Japan, Institute of Electronics, Information and Communication Engineers, Jan. 21, 2013, 8 pages.
Alvarez et al., "Comprehensive survey on privacy-preserving protocols for sealed-bid auctions." Computers & Security 88, Apr. 3, 2019, 14 pages.
Ardian Poernomo, "Dovekey" Submitted on Sep. 23, 2020, <https://github.com/google/ads-privacy/tree/master/proposals/dovekey>, 7 pages.
Garay et al., "A little honesty goes a long way." Theory of Cryptography Conference. Springer, Berlin, Heidelberg, Mar. 2015, 134-158.
International Search Report and Written Opinion in International Appln. No. PCT/US2022/019169, dated Jun. 13, 2022, 14 pages.
International Search Report and Written Opinion in International Appln. No. PCT/US2022/019171, dated Jun. 15, 2022, 14 pages.
Kikuchi et al., "Distributed auction servers resolving winner and winning bid without revealing privacy of bids." Proceedings Seventh International Conference on Parallel and Distributed Systems: Workshops. IEEE, Jul. 4, 2000, 6 pages.
Kikuchi, "(M+ 1) st-price auction protocol." IEICE Transactions on Fundamentals of Electronics, Communications and Computer Sciences 85.3, Mar. 2002, 676-683.
Lindell, "Secure multiparty computation." Communications of the ACM 64.1, Dec. 17, 2020, 86-96.
International Preliminary Report on Patentability in International Appln. No. PCT/US2022/019169, mailed on Sep. 21, 2023, 8 pages.
International Preliminary Report on Patentability in International Appln. No. PCT/US2022/019171, mailed on Sep. 21, 2023, 8 pages.
Extended European Search Report in European Appln. No. 24195469.2, mailed on Oct. 31, 2024, 7 pages.
Office Action in Chinese Appln. No. 202280003163.8, mailed on Dec. 20, 2024, 15 pages (with English translation).
Office Action in Indian Appln. No. 202227059806, mailed on Mar. 24, 2025, 8 pages (with English translation).
Office Action in Chinese Appln. No. 202280004253.9, mailed on May 29, 2025, 11 pages (with English translation).
Office Action in Korean Appln. No. 10-2022-7039722, mailed on May 15, 2025, 14 pages (with English translation).

* cited by examiner

US 12,401,502 B2

FLEXIBLE CONTENT SELECTION PROCESSES USING SECURE MULTI-PARTY COMPUTATION

CROSS-REFERENCE TO RELATED APPLICATIONS

This application is a National Stage Application under 35 U.S.C. § 371 and claims the benefit of International Application No. PCT/US2022/019171, filed Mar. 7, 2022, which claims the benefit of priority to Israeli Application Serial No. 281328, filed Mar. 8, 2021, both of which are incorporated by reference herein in their entireties.

TECHNICAL FIELD

This specification is related to cryptography and data security.

BACKGROUND

Secure multi-party computation (MPC) is a family of cryptographic protocols that prevents access to data by distributing a computation across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

In general, one innovative aspect of the subject matter described in this specification can be embodied in methods that include receiving, by a first server of a secure multi-party computation (MPC) system and from a client device, a digital component request; identifying, for each digital component in a set of digital components, a selection value for the digital component and a priority tier for the digital component; for each of multiple priority tiers: determining, using a secure MPC process in collaboration with one or more second servers of the secure MPC system, a first secret share of a winner parameter for each digital component in the priority tier, including: determining, for each digital component in the priority tier, a first secret share of a candidate parameter that indicates whether the digital component is a candidate for selection; and determining a secret share of the winner parameter for each digital component in the priority tier based on (i) a first secret share of the value of the candidate parameter for each digital component in the priority tier, (ii) one or more second secret shares of the candidate parameter for each digital component in the priority tier, and the selection value for each digital component in the priority tier; identifying a highest tier of the plurality of tiers for which a given digital component has a winner parameter that indicates that the given digital component is a winning digital component for the tier; and providing, to the client device, a first secret share of a selection result identifying the given digital component. Other implementations of this aspect include corresponding apparatus, systems, and computer programs, configured to perform the aspects of the methods, encoded on computer storage devices.

These and other implementations can each optionally include one or more of the following features. In some aspects, determining, using the secure MPC process in collaboration with one or more second servers of the secure MPC system, the first secret share of the winner parameter for each digital component in the priority tier includes determining the first secret share of the winner parameter for each digital component in each priority tier in parallel. This embodiment is particularly advantageous since this can improve the speed at which the overall digital content selection process is performed.

In some aspects, determining, using the secure MPC process in collaboration with one or more second servers of the secure MPC system, the first secret share of the winner parameter for each digital component in the priority tier includes determining the first secret share of the winner parameter for each digital component in each priority tier in a sequence from a highest priority tier to a lowest priority tier. This embodiment is particularly advantageous in situations where the speed of the process is not critical. Instead, this particular embodiment makes efficient use of computational resources by avoiding wasted computations for lower priority tiers if a higher priority tier includes a winning digital component.

In some aspects, determining, for each digital component in the priority tier, a first secret share of a candidate parameter that indicates whether the digital component is a candidate for selection includes determining, in collaboration with each of the one or more second servers, the first secret share of the candidate parameter for a particular digital component based on secret shares for one or more conditions for the particular digital component.

In some aspects, identifying, for each digital component in the set of digital components, the selection value for the digital component includes identifying, for a given content platform, a boost established by a publisher of an electronic resource for which the digital component request was received or a content platform for the publisher and adjusting the selection value for each digital component of the content platform using the boost.

Some aspects include identifying a selection value floor established by a publisher of an electronic resource for which the digital component request was received and filtering, from the set of digital components, one or more digital components having a selection value that is less than the selection value floor. Those digital components that are filtered from the set of digital components may correspond to unnecessary and/or irrelevant digital components (because they have a selection value lower than the floor value). Filtering out unnecessary digital components in this way can therefore reduce network bandwidth usage and computational resource usage, thereby making the overall content selection process more efficient.

In some aspects, determining a secret share of the winner parameter for each digital component in the priority tier includes ordering the digital components in the priority tier based on the selection value for each digital component in the priority tier, determining, a first secret share of an accumulated value for each digital component in the tier based at least on the order and the first secret share of the candidate parameter for each digital component in the priority tier, wherein the accumulated value for a digital component indicates a quantity of candidate digital components in the priority tier having a higher selection value than the digital component, and for each digital component in the priority tier, determining the first secret share of the winner parameter for the digital component based on the first secret share of the candidate parameter for the digital component, each of the one or more second secret shares of the candidate parameter for the digital component, and the accumulated value for the digital component. Some aspects include determining a second selection value corresponding to a second value selection process, including determining, for each priority tier, a first secret share of a winning tier parameter that represents whether the given digital component is included in the priority tier, determining, for each digital component in the set of digital components, a first secret share of a second selection value parameter that represents whether the selection value for the digital component might be second highest selection value among a set of candidate digital components, identifying, as the second selection value, a selection value for a digital component for which (i) the candidate parameter for the digital component indicates that the digital component is a candidate for selection, (ii) the winning tier parameter indicates that the given digital component is included in the winning tier, and (iii) the second selection value parameter that indicates that the selection value for the digital component might be second highest selection value among a set of candidate digital components.

The subject matter described in this specification can be implemented in particular embodiments so as to realize one or more of the following advantages. Using a secure MPC process performed by two or more MPC servers operated by different parties to select digital components based on shares of user information ensures that the user information cannot be accessed in cleartext by either MPC server or another party absent unauthorized collusion between the MPC servers. In this way, as long as at least one MPC server is honest, user data privacy is preserved.

In a digital component selection process, the MPC servers can select from eligible digital components that satisfy one or more eligibility conditions while preventing the parties from accessing user information in cleartext. The eligibility conditions can include restrictions and guidelines on the manner or frequency of distribution of a digital component, among other factors. The conditions can include user group membership, frequency control, muting (e.g., user blocking), k-anonymity for preventing micro-targeting of users, and/or pacing and budget constraints.

As the selection of digital components is an online process that typically occurs at the time that content is being loaded at a client device, it is important that this process be completed quickly, e.g., within milliseconds. The techniques described in this document enhances the speed at which digital components are selected by reducing the size of data transmitted between the client device and the MPC cluster, by reducing the computational resources required by the MPC cluster, and by reducing the number of roundtrip communications/computations performed by the servers of the MPC cluster and the size of data transmitted between the servers. The reduction in data size between the client device and server also reduces network bandwidth consumption and battery consumption of the client device, e.g., if the client device is a mobile device running on battery power.

A client device of a user can generate a probabilistic data structure, e.g., a cuckoo filter or a Bloom filter, that represents user groups that includes the user as a member and can provide the probabilistic data structure, or data that represents the probabilistic data structure, to the servers of the MPC cluster. Using probabilistic data structures in this way protects user privacy and maintains data security by preventing access to the user's group membership, and reduces the size of the information provided to the MPC cluster as probabilistic data structures are compact representations of sets of data. The data representing the probabilistic data structure can be generated and sent to the MPC servers such that no party that receives only a portion of the data can access the user group membership of a user without either having the other portions or collaborating with the other MPC servers, e.g., using a secure MPC process. The reduction in data size reduces the amount of bandwidth consumed to transmit the information, reduces the latency in transmitting the information, and reduces the amount of processing power and associated battery power for devices running on batteries (e.g., mobile devices) required to transmit the information.

The MPC cluster can transmit secret shares of a result that identifies a selected digital component that the MPC cluster selected using the secure MPC process. By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

The secure MPC techniques described in this document are flexible and support different types of selection processes and/or additional selection process features, such as floors, tiers, and/or boosts. The secure MPC techniques described in this document enable such features while still preserving user privacy and data security. When tiers are used, multiple selection processes can be performed in parallel to reduce the latency in selection of digital components or in sequence to reduce unnecessary computations. Metrics that can be used to improve the efficiency of digital component selection processes can be aggregated and reported to appropriate parties in ways that preserve user privacy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for using secure MPC to select digital components in ways that preserve user privacy and protects the security of data of each party that is involved in the selection process. Enhancements to the selection process support multiple variations of the digital component selection processes, providing flexibility to content publishers and content platforms that manage the selection of digital components, while maintaining user privacy and data security. For example, MPC clusters described in this document can perform secure digital component selection processes that include tiers, selection value boosts, first value selection processes, second value selection processes, and/or a combination of one or more of these variations. The techniques described in this document allow for such flexibility, privacy preservation, and data security while still providing digital components in short time periods, e.g., within milliseconds, after a request is received and while minimizing the size of data sent to and from the client device that displays the digital component.

The MPC cluster can also generate information, e.g., metrics, based on completed selection processes that can be used to further enhance future digital component selection processes. This information can be generated using secure MPC such that user data and data for publishers and/or content platforms is not accessible absent unauthorized collusion between the servers of the MPC cluster and/or other parties. The information can be reported to the appropriate parties in encrypted form, e.g., as secret shares, such that only the recipient can access the information in cleartext. To protect user privacy, in some implementations, the intended recipient can access the information in cleartext with differential privacy noise applied, and/or in aggregated forms. Cleartext is text that is not computationally tagged, specially formatted, or written in code, or data, including binary files, in a form that can be viewed or used without requiring a key or other decryption device, or other decryption process.

In this document, some computations performed over secret shares by the MPC cluster are shown as being products or sums of secret share values. To increase the speed at which these computations are performed, multiplications can be performed in secret shares using AND operations, e.g., bitwise-AND, and additions can be performed in secret shares using XOR operations, e.g., bitwise-XOR operations. In some cases, when one cleartext integer is multiplied by a secret share representing zero or one in Z2 (i.e., the sum of the two shares modulo 2 is either zero or one), no multiplication or bitwise-AND is needed. Instead, each computing system can evaluate its share and return the integer if its share is one and zero if its share is zero.

Figure 1:
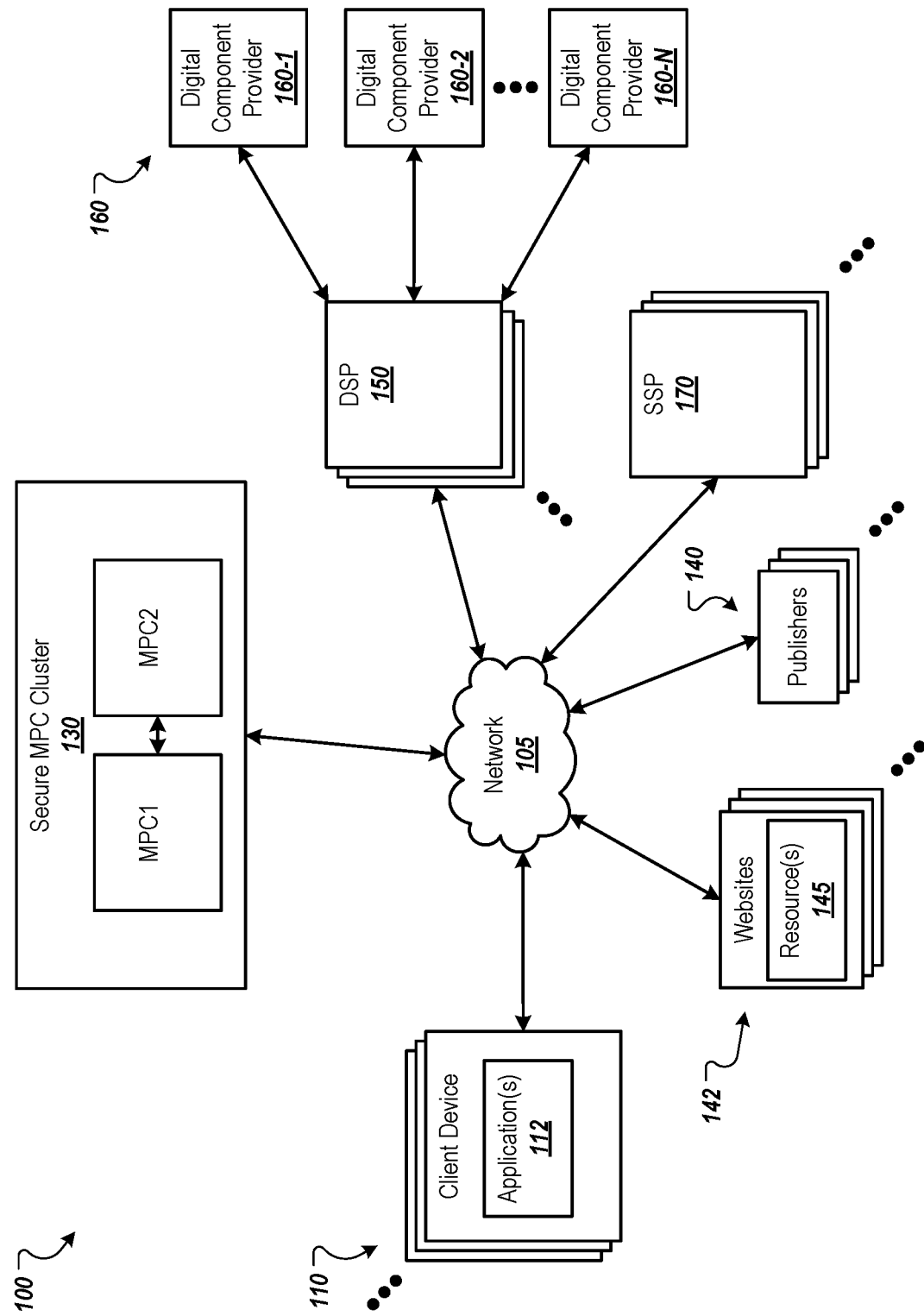
FIG. 1 is a block diagram of an environment in which an MPC cluster performs secure MPC processes to select digital components for distribution to client devices.

FIG. 1 is a block diagram of an environment 100 in which an MPC cluster 130 performs secure MPC processes to select digital components for distribution to client devices 110. The MPC cluster 130 also generates information for completed digital component selection processes and provides the information to the appropriate parties.

The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms, e.g., supply-side platforms (SSPs) 170 and demand-side platforms (DSPs) 150. The example environment 100 can include many different client devices 110, secure MPC clusters 130, publishers 140, websites 142, DSPs 150, and SSPs 170.

A website 142 includes one or more electronic resources 145. The resources 145 can be associated with a domain name and hosted by one or more servers. An example website is a collection of web pages formatted in hypertext markup language (HTML) that can contain text, images, multimedia content, and programming elements, such as scripts. Each website 142 is maintained by a content publisher 140, which is an entity that controls, manages and/or owns the website 142.

A resource 145 is any data that can be provided by the publisher 140 over the network 105 and can be associated with a resource address. Resources include HTML pages, word processing documents, and portable document format (PDF) documents, images, video, and feed sources, to name just a few. The resources 145 can include content, such as words, phrases, pictures, and so on, and may include embedded information (e.g., meta information and hyperlinks) and/or embedded instructions, e.g., scripts.

A client device 110 is an electronic device that is capable of communicating over the network 105. Example client devices 110 include personal computers, mobile communication devices, e.g., smart phones, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device, e.g., for mobile devices having a particular operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by the application 112. More specifically, the digital component may include digital content that is relevant to the resource content, e.g., the digital component may relate to the same topic as the web page content, or to a related topic. The provision of digital components can thus supplement, and generally enhance, the web page or application content.

When the application 112 loads a resource (or application content) that includes one or more digital component slots, the application 112 can request a digital component for each slot. In some implementations, the digital component slot can include code, e.g., one or more scripts, that, when processed by the application 112, cause the application 112 to request a digital component for display to a user of the client device 110. As described below, the application 112 can request digital components from the MPC cluster 130 and/or one or more SSPs 170.

Some publishers 140 use an SSP 170 to manage the process of obtaining digital components for digital component slots of its resources 145 and/or applications 112. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are displayed in digital component slots of publishers' resources 145 and applications 112. For example, a digital component provider 160 can create digital components that include content related to the digital component provider 160. In a particular example, a digital component of a product manufacturer can include content related to the product.

The digital component providers 160 can use a DSP 150 to manage the provisioning of its digital components for display in digital component slots. A DSP 150 is a technology platform implemented in hardware and/or software that automates the process of distributing digital components for display with the resources and/or applications. A DSP 150 can interact with multiple SSPs 170 on behalf of digital component providers 160 to provide digital components for display with the resources 145 and/or applications 112 of multiple different publishers 140. In general, a DSP 150 can receive requests for digital components (e.g., from an SSP 170), generate (or select) a selection value for one or more digital components created by one or more digital component providers 160 based on the request, and provide data related to the digital component (e.g., the digital component itself or code that enables the digital component to be downloaded) and the selection parameter to an SSP 170. The selection value can indicate an amount that the digital component provider 160 is willing to provide for display or user interaction with the digital component. The SSP 170 can then select a digital component for display at a client device 110 and provide, to the client device 110, data that causes the client device 110 to display the digital component, e.g., by providing the digital component or the code that enables download of the digital component. As described in more detail below, the MPC cluster 130 can select digital components for the client device 110 to display in a manner that preserves user privacy.

In some cases, it is beneficial to a user to receive digital components related to web pages, application pages, or other electronic resources previously visited and/or interacted with by the user. In order to distribute such digital components to users, the users can be assigned to user groups, e.g., user interest groups for users interested in the same or similar topics, cohorts of similar users, or other group types involving similar user data. The users can be assigned to user groups when the users visit particular resources or perform particular actions at the resource (e.g., interact with a particular item displayed on a web page or add the item to a virtual cart). The user groups can be generated and updated by the digital component providers 160. That is, each digital component provider 160 can assign users to their user groups when the users visit electronic resources of the digital component providers 160. The user groups can also be created by and/or updated by the content platforms, e.g., by DSPs 150 and/or SSPs 170.

To protect user privacy, a user's group membership can be maintained at the user's client device 110, e.g., by one of the applications 112, the operating system of the client device 110, or another trusted program rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a user group identifier for each user group that includes the user as a member. The digital component providers 160 or content platforms that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 displays a resource (e.g., web page), application content, or digital component related to a digital component provider 160, the resource, application content, or digital component can request that the application 112 add one or more user group identifiers to the user group list. In response, the application 112 can add the one or more user group identifiers to the user group list and store the user group list securely. For example, a web page at which a user selects to view more information about a particular item can add the user to a user group related to the particular item.

In some implementations, the MPC cluster 130 can use the user group membership of a user to select digital components that may be of interest to the user or may be beneficial to the user/user device in another way. For example, such digital components or other content may include data that improves a user experience, improves the running of a user device, or benefits the user or client device 110 in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. The MPC cluster 130 can also use other conditions to select digital components, as described in more detail below.

Figure 9:
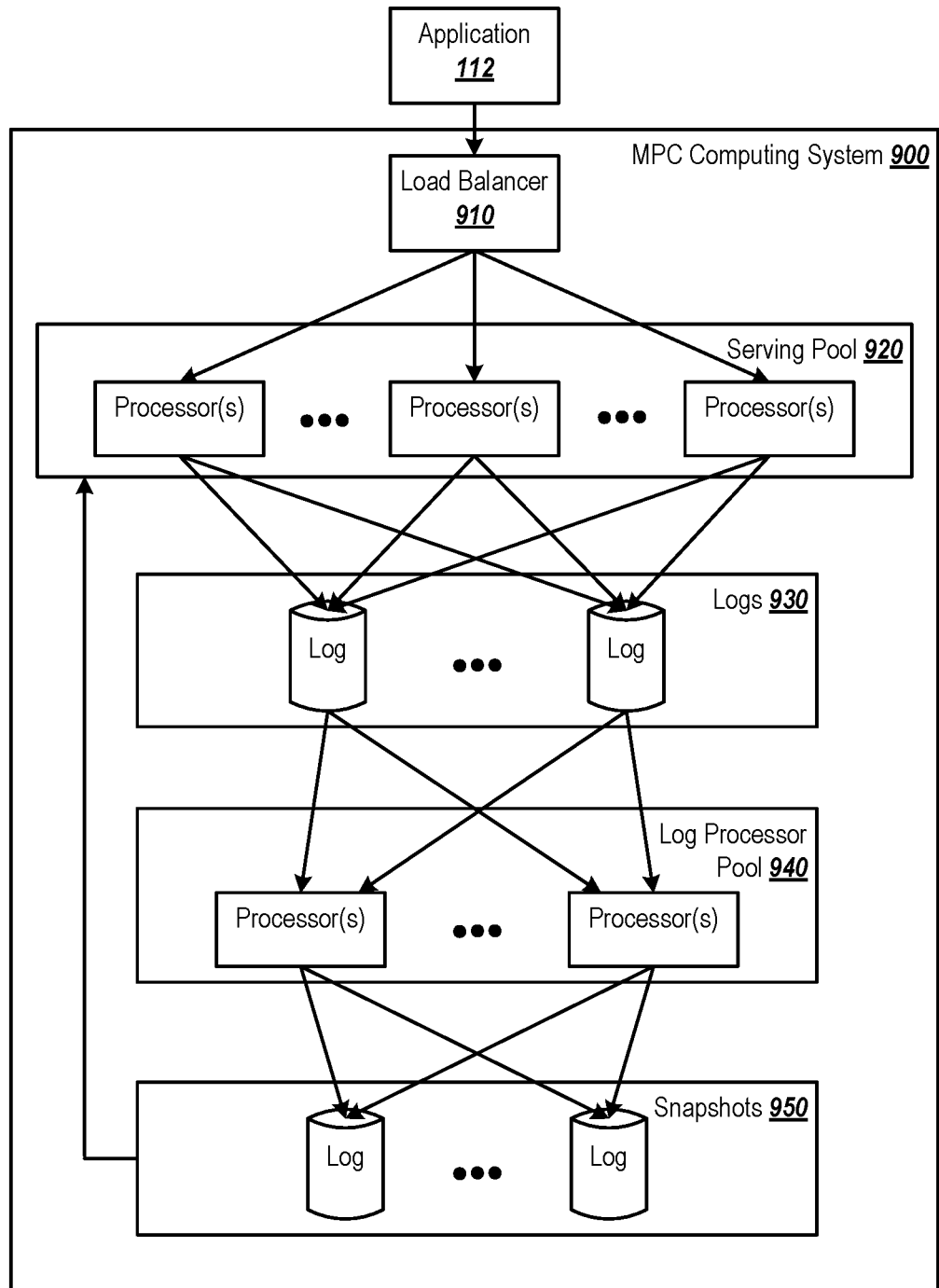
FIG. 9 is a block diagram of an example MPC computing system.

The secure MPC cluster 130 includes two computing systems MPC1 and MPC2 that perform secure MPC processes to select digital components for distribution to client devices of users based on the user's group membership, but without accessing the group membership or other user information, or signals derived from such user information, in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes. Each computing system can be a server or other appropriate type of computer. An example architecture for an MPC computing system is shown in FIG. 9.

The computing systems MPC1 and MPC2 can be operated by different entities. In this way, each entity may not have access to the users' group membership, or other user information, or signals derived from such user information, in cleartext. For example, one of the computing systems MPC1 or MPC2 can be operated by a trusted party different from the users, the publishers 140, the DSPs 150, the SSPs 170, and the digital component providers 160. For example, an industry group, governmental group, or browser developer can maintain and operate one of the computing systems MPC1 and MPC2. The other computing system can be operated by a different one of these groups, such that a different trusted party operates each computing system MPC1 and MPC2. Advantageously, the different parties operating the different computing systems MPC1 and MPC2 may have no incentive to collude to endanger user privacy. In some implementations, the computing systems MPC1 and MPC2 are separated architecturally and are monitored to not communicate with each other outside of performing the secure MPC processes described in this document.

Each computing system MPC1 and MPC2 can store digital components (e.g., the creatives for the digital components), selection values for digital components, and other information for digital components. For example, the computing systems MPC1 and MPC2 can cache selection values previously received from SSPs 170 and/or DSPs 150 as part of previous digital component selection processes or that are otherwise provided to the computing systems MPC1 and MPC2, e.g., that are provided in advance for use in digital component selection processes. In this way, the MPC cluster 130 can use the selection values to select digital components for distribution to client devices 110 in response to future digital component requests received from client devices 110. A digital component for which a selection value and other information is stored by the MPC cluster 130 for digital component selection processes can be referred to as a stored digital component in this document. However, the digital component itself is not necessarily stored by the MPC cluster 130. Instead, the MPC cluster 130 can store data, e.g., code that references a network location from which the digital component can be downloaded, for each stored digital component. In some implementations, the digital component itself is stored, and is returned to the application 112 directly, by the MPC cluster 130. Such implementation reduces the need for application 112 to fetch the digital components, and/or other information for digital components, in additional requests that may consume battery and bandwidth of the device, and may leak additional signals for the server hosting the digital component itself to track the device.

For each stored digital component, each computing system MPC1 and MPC2 can store a selection value or a vector of values that can be used by the computing systems MPC1 and MPC2 to determine a selection value for the digital component. Each computing system MPC1 and MPC2 can also store, for each digital component, condition data that defines condition(s) that must be met for the digital component to be an eligible candidate for a given digital component selection process. A stored digital component can have zero or more corresponding conditions.

One example condition is that the user to which a selected digital component will be provided is a member of a user group corresponding to the stored digital component. This condition can be referred to as a user group membership condition. In this example, the computing systems MPC1 and MPC2 can store, for a stored digital component, a set of one or more user group identifiers that correspond to the digital component. These user group identifiers identify the user groups for which the stored digital component can be provided. That is, the stored digital component is only a candidate for a digital component selection process that is performed to select a digital component to provide to a user that is a member of at least one of the user groups identified by the set of one or more user group identifiers for the stored digital component.

Another example condition for a stored digital component is a frequency cap condition that indicates that the digital component, or digital components of a particular category, can only be provided to the same user a maximum number of times over a given time duration. Another example condition for a digital component is a blocked digital component condition that indicates that the digital component has been blocked, e.g., muted, by a user. For these example conditions, the computing systems MPC1 and MPC2 can receive from store, for each of multiple users, a probabilistic data structure, e.g., a cuckoo filter or Bloom filter, that represents digital components that cannot be provided to the user. For example, the probabilistic data structure can represent universal identifiers for digital components that are blocked either by the user directly or due to the frequency at which the digital component is displayed to the user being exceeded during the given time duration.

The computing systems MPC1 and MPC2 can receive the probabilistic data structures from the client devices 110 of the users, e.g., in an encrypted form that prevents either computing system MPC1 or MPC2 from accessing the identifiers in cleartext. For example, the application 112 running on a user's client device 110 can generate a Bloom filter that represents the identifiers for the blocked digital components that are blocked due to frequency capping or blocked by the user. The application 112 can then provide data to each computing system MPC1 and MPC2 that enable the computing systems MPC1 and MPC2 to collaboratively query the Bloom filter using a secure MPC process to determine whether a given digital component is blocked for the user. The computing systems MPC1 and MPC2 calculate secret shares of a blocked digital component condition using this secure MPC process. An example process for generating and querying a Bloom filter is described with reference to FIG. 8.

In some implementations, the identifiers for the blocked digital components can be included in the same probabilistic data structure as the user group identifiers and queried using different hash functions. However, the target false positive rate for the blocked digital components can be lower than the false positive rate for the user group identifiers. Thus, fewer hash functions can be used to generate and query a Bloom filter for blocked digital components than for user group identifiers. To reduce the data size of the Bloom filter for the blocked digital components, the user group identifiers can be represented by a different Bloom filter than the blocked digital components. This reduces latency in sending the Bloom filters over a network, reduces consumed bandwidth in sending the Bloom filters, and reduces battery power usage to send the Bloom filters.

Another example condition for a stored digital component is a pacing condition that paces the distribution of the digital component over a time duration. The computing systems MPC1 and MPC2 can store data that indicates the total number of times the digital component can be provided over a time duration and/or a maximum budget for the digital component for the time duration. The computing systems MPC1 and MPC2 can use this information to pace how often the digital component can be a candidate for digital component selection processes based on this condition (e.g., all conditions for the digital component would have to be satisfied for the digital component to be a candidate). In some implementations, the computing systems MPC1 and MPC2 can implement a feedback controller, e.g., a proportional-integral-derivative (PID) controller using secret shares to pace stored digital components that have a pacing condition.

In this example, the computing systems MPC1 and MPC2 can store the setpoint for the PID controller for a digital component and maintain the measured variable for the PID controller for the digital component. In general, a PID controller is a feedback controller that uses an error value, which is a difference between a target setpoint and a measured variable, to determine an output that drives the measured variable towards the setpoint. In the context of pacing the distribution of digital components to client devices, the setpoint for a campaign can be an impression rate, an interaction rate, a conversion rate, and/or a resource depletion rate (e.g., a budget spend rate). Similarly, the measured variable can be an impression rate, an interaction rate, a conversion rate, and/or a resource depletion rate over a given time duration. The computing systems MPC1 and MPC2 can also store the tuning parameters for each PID controller. The setpoint, measured variable, and tuning parameters can be stored in secret shares (with each computing system MPC1 and MPC2 storing a corresponding share of each parameter) or in cleartext depending on the target privacy/data security.

Another example condition is a k-anonymity condition. A k-anonymity condition can include a k-anonymity rule that requires that a digital component be eligible (or would have been selected) for distribution to at least k users over a given duration of time. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, displayed to a set of at least k users or by at least k applications 112 within a particular period of time. In some implementations, each of the k applications 112 to which the digital component could have been, or was distributed must be for a different user. In this example, the computing systems MPC1 and MPC2 can store, for a digital component, the value k and maintain a number of users to which the digital component could have been distributed.

To determine the number of users that a digital component could have been displayed can include executing a counterfactual digital component selection process in parallel with each actual digital component selection process. In this counterfactual digital component selection process, all digital components can be candidates if they satisfy all conditions other than the k-anonymity condition. If the digital component is selected for at least k users or applications 112 in the counterfactual digital component selection processes, the digital component would have been displayed to k users if not for the k-anonymity condition. Once this happens, the digital component which satisfies the k-anonymity condition can be included in the actual digital component selection processes (assuming the other conditions, if any, for the digital component are satisfied), which does not include digital components that have an unsatisfied k-anonymity condition.

In some implementations, each computing system MPC1 and MPC2 stores information for the digital components in a data structure that maps the digital components and their respective information to a set of contextual signals. For example, each digital component can be eligible for display in presentation environments with resources and/or applications that include a set of contextual signals. The contextual signals can include, for example, the topic of the resource, keywords found in the resource, the resource locator for the resource, the geographic location of the client device 110, the spoken language setting of the application 112, the number of digital component slots of the resource, the type of digital component slot, and/or other appropriate contextual signals. In addition, a digital component can have multiple corresponding selection values, one for each set of contextual signals. Using such a data structure enables the computing systems MPC1 and MPC2 to identify the digital components that are eligible for a digital component selection process. The computing systems MPC1 and MPC2 can then use the conditions to identify, from these eligible digital components, the digital components that are actual eligible candidates for selection in the digital component selection process. The set of contextual signals for use in determining whether a digital component is eligible can be in the form of a lookup key that enables the computing systems MPC1 and MPC2 to lookup the eligible digital components using contextual signals of a digital component request.

When the digital components are associated with corresponding user group identifiers that identify eligible user groups for the digital components, the information can be stored using a lookup table (LUT). Using a LUT can provide some performance advantages, but other appropriate data structures can also be used. The LUT maps contextual signals, or lookup keys derived from contextual signals, to a set of digital components such that the set of digital components is eligible for display and/or for which a selection value or vector is eligible, subject to other conditions described in this document. In this way, the computing systems MPC1 and MPC2 can store, for each digital component, multiple selection values, e.g., one for each set of contextual signals.

In some implementations, the lookup key is hash-based message authentication code (HMAC) of the contextual signals. For example, the lookup key can be HMAC(URL, HMAC(language, location)), where the parameter URL is the URL of a resource for which a digital component and selection value is eligible, the parameter language is the specified spoken language for the applications 112 for which the digital component and selection value are eligible, and the parameter location is the geographic location for which the digital component and selection value are eligible. If the contextual signals of a digital component request match these parameters, the digital component and selection value mapped to the lookup key is eligible for the digital component selection process for selecting a digital component in response to the request. Other contextual signals can be used in addition to, or in place of, URL, location, and language.

To reduce the amount of bandwidth consumed by transmitting a digital component request over the network 105 and the amount of latency, the application 112 can calculate the lookup key using the same HMAC rather than sending the contextual signals to the computing systems MPC1 and MPC2. This also reduces the amount of battery consumed by the client device 110 and the amount of data received by each computing system MP1 and MPC2.

In some implementations, a two stage LUT table is used, e.g., when the digital components are conditioned on user group membership for the user. The first stage can be keyed by a request key (UG_Request_Key). The UG_Request_Key can be a lookup key that is in the form of a composite message that is based on a set of contextual signals, e.g., a set of contextual signals of a digital component request (e.g., URL, location, language, etc.) or a set of contextual signals for which a digital component is eligible for distribution. That is, the first stage LUT can be keyed based on a set of contextual signals. The key for the first stage can be a hash of the UG_Request_Key, e.g., using a hash function such as SHA256. This key can be truncated to a specified number of bits, e.g., to 16 bytes, or another appropriate number of bits. The value for each key UG_Request_Key in the first stage LUT can indicate the rows of the second stage LUT that includes data for digital components that are eligible for digital component requests that include the contextual signals of the UG_Request_Key. An example first stage LUT is shown below as Table 1.

TABLE 1

| Key | Value |
|---|---|
| SHA256(UG_Request_Key) | Rows . . . |
| . . . | Rows . . . |

The second stage LUT can be keyed based on a combination of the user group request key UG_Request_Key in the first stage LUT and a user group identifier. In some implementations, the second stage LUT can be an array or other appropriate data structure. Each row in the second stage LUT can be for a particular selection value (or vector of values) for a particular digital component. For example, a DSP 150 can submit different selection values for the same digital component, with each selection value being for a different set of contextual signals and/or different user group identifiers. Thus, the selection values for a digital component can vary based on context and user group membership of the user for which the digital component selection process is being performed.

A DSP 150 or digital component provider 160 can associate, e.g., link or map, a digital component to a user group to which the DSP 150 or digital component provider wants the digital component to be displayed. For example, a DSP 150 may want a digital component related to fly fishing to be displayed to men that have shown an interest in fly fishing. In this example, the DSP 150 can provide, to the MPC cluster 130, data indicating that the digital component corresponds to the user group identifier for a user group that includes men that have shown an interest in fly fishing.

In some implementations, the key for a row in the second stage LUT can be a hash or code generated based on the combination of the user group request key UG_Request_Key and the user group identifier for the digital component of the row. For example, the key can be a HMAC of the combination, which can be represented as $HMAC_{SHA256}$(UG_Request_Key, ug_id). The user group identifier ug_id can be based on a combination of an internal user group identifier for the user group and a domain of the owner of the user group (e.g., of the DSP, SSP, or digital component provider that owns the user group). For example, the user group identifier ug_id can be a digital digest of the eTLD+1 of the owner domain and the owner's internal user group identifier for the user group. The eTLD+1 is the effective top-level domain (eTLD) plus one level more than the public suffix. An example eTLD+1 is "example.com" where ".com" is the top-level domain. The ug_id can be truncated to 16 bytes or another appropriate data size.

Continuing the previous fly fishing example, the second stage lookup key for the row that includes information for the digital component that is to be displayed to users in the men's fly fishing group can be a combination of the user group request key UG_Request_Key and the user group identifier ug_id for the men's fly fishing group. As the digital component can be presented in different contexts, the second stage lookup table can include multiple rows for the digital component associated with the user group identifier ug_id for the men's fly fishing group, each with different user group request key UG_Request_Key and different values.

The value for each row of the second stage LUT can be the selection value (or vector of values) for the digital component and other data for the digital component, e.g., metadata that identifies the digital component or the network location from which the digital component can be downloaded, etc. In some implementations, the row can contain the digital component itself ready to be rendered by the application 112, e.g., in a web package format.

The value can be a digital component information element dc_information_element, which can be a byte array having the selection value and the metadata. The byte array can have a particular format that applications 112 or trusted programs of client devices 110, and the computing systems MPC1 and MPC2 can parse to obtain the selection value and metadata. In some implementations, the digital component information element can include the digital component itself An example second stage LUT is shown below as Table 2. When vectors are used for determining selection values, the selection value can be replaced by the vector in Table 2.

TABLE 2

| Key | Value |
|---|---|
| HMAC(UG_Request_Key, UG_ID) | {selection value, metadata} |
| . . . | . . . |

The second stage LUT maps a selection value to a particular digital component, to a particular user group identifier ug_id, and to a particular set of contextual signals defined by the first stage lookup key UG_Request_Key. By doing so, the second stage LUT indicates the particular context of a digital component slot for which the selection value for the digital component is eligible. This allows a DSP 150 or digital component provider 160 to specify different selection values for the same digital component for different contexts defined by the contextual signals and a user's group membership. When a digital component request is received that indicates that the user to which the digital component will be displayed is a member of a particular user group identified by a particular user group identifier ug_id and the digital component will be displayed in a particular context defined by the contextual signals of the first stage lookup key, any digital component having a selection value in the second stage LUT that has a matching user group identifier and a matching first stage lookup key is a candidate for being selected for distribution in response to the request.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
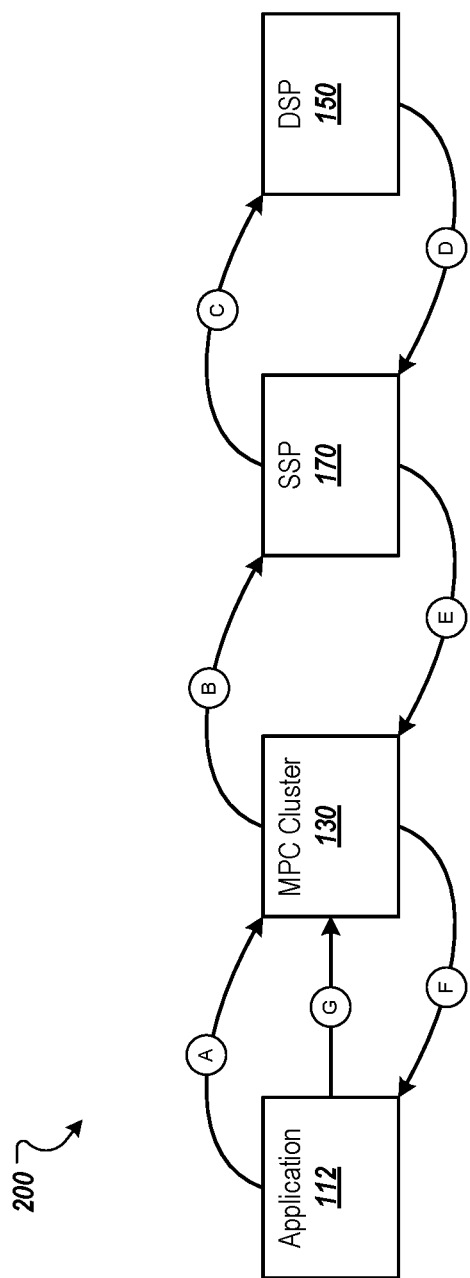
FIG. 2 shows an example data flow within the environment of FIG. 1.

FIG. 2 shows an example data flow within the environment 100 of FIG. 1. This description includes two types of selection values: selection values that are conditioned on either sensitive user information, such as user group membership or other business sensitive information, or parameters whose changes in value can allow unscrupulous parties to infer the sensitive information, or "conditional selection values"; and selection values that are not conditioned on sensitive information, or "unconditional selection values." To protect user privacy, the conditions for "conditional selection values" are evaluated within MPC cluster 130 instead of SSP 170 or DSP 150 to determine whether "conditional selection values" are candidates for the content selection process.

This structure allows the MPC cluster 130 to protect user privacy and business confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computing systems of the MPC cluster 130 is honest, there is no leaking of confidential user data or business confidential information. If the MPC cluster 130 includes more than two computing systems, the current MPC protocol can be expanded, or other MPC protocols can be used.

The MPC cluster 130 runs the secure 2PC protocol to evaluate and apply conditions to select candidate digital components, conduct selection processes to select a digital component based on selection values, and to receive impression notifications to update parameters on which those conditions depend. All of these processes can be done using secret sharing techniques. This protocol is described in detail with reference to FIG. 3.

In stage A, an application 112, e.g., in collaboration with a triggering element from a content platform, such as SSP 170, sends a request for a digital component to the MPC cluster 130. The application 112 can include multiple requests for digital components together into one combination request to fetch multiple digital components. The MPC cluster 130 can then serve each request in the combination request independently, or make one or more selection decisions holistically. In this example, the request is for a single digital component, and includes a request for a digital component that is selected based on sensitive information or a digital component that is selected without using sensitive information. The MPC cluster 130 can respond to the request by selecting a particular digital component corresponding to a particular selection value from among a set of selection values that are each mapped to a respective particular digital component. These selection values can be selections values that were previously cached, or otherwise stored, at the MPC cluster 130 and/or selection values generated by a platform, such as DSP 150 or SSP 170, just-in-time (JIT) selection values. JIT selection values are generated directly in response to need, and increase efficiency and decrease waste, because the selection values are only generated when a digital component is needed. For example, JIT selection values can be generated when a digital component slot becomes available—this is indicated by the receipt of a request for a digital component. Thus, the MPC cluster 130 can select a digital component from a set of digital components that include stored digital components for which information is stored at the MPC cluster 130 and digital components for which JIT selection values are received for the current digital component request.

In some implementations, the selection value for a digital component can be determined using two or more vectors. The MPC cluster 130 can store, for a digital component, a first vector of values that can be used to determine a selection value for the digital component. The first vector of values can be specific to one or more user groups, e.g., can be used to determine a selection value for the digital component when a digital component is being selected for a user that is a member of the one or more user groups. Thus, the first vector of values can also be referred to as a user group-based vector. The user group-based vector can include multiple elements across two or more dimensions and each element can represent a particular feature of a digital component presentation opportunity. For example, the user group-based vector of values can include elements for geographic locations or regions, spoken languages, ages or age ranges, particular URLs of web pages or other electronic resources, particular products or services, whether a digital component slot is above or below the fold, the type of digital component slot, the size of the digital component slot, the number of digital component slots on the electronic resource, the time of day, web property identifier, and/or other appropriate features of digital component presentation opportunities. In some implementations, e.g., implementations that adopt neural networks, the user group-based vector of values can be an embedding of the user group in some abstract vector space.

The value of each element can reflect an amount to increase or decrease a selection value for the digital component based on a current digital component presentation opportunity having the feature corresponding to the element. For example, if a DSP 150 wants the digital component to be displayed to users in Atlanta, but not users in Dallas, the value for an element for Atlanta can be a positive value above a value of one, and the value for an element for Dallas can be a positive value below one, e.g., zero, or a negative value. As described in more detail below, the values of the user group-based vector can be part of a vector dot product computation to determine a selection value for the digital component.

The request contains information used in a digital component selection process, including information that can be sensitive, such as user group identifiers for user groups to which the application 112 is mapped or otherwise associated, and information that is not sensitive, such as contextual signals from the application 112 regarding the context in which the digital component will be presented and/or displayed. As described in further detail below, the design of system 110 improves the protection of user data that can be sensitive or confidential.

The triggering element can be, for example, a tag that detects the presence of a digital component slot within an internet location visited by application 112. The triggering element can be placed, for example, at the Internet location and can inform the application 112 of the presence of a digital component slot for which a digital component should be requested.

In stage B, the MPC cluster 130 transmits a digital component request that is based on information that is not sensitive, such as contextual signals, to SSP 170. This request is referred to as a "contextual request." The contextual request can contain various contextual signals and non-sensitive user information gathered directly by the Internet location (e.g., a content publisher) that triggered the request for a digital component. For example, the contextual signals can include analytics data, language settings, and other data that assist the content publisher with providing a good user experience. The contextual request provided to SSP 170 does not, however, include sensitive information, such as user group identifiers.

In stage C, the SSP 170 forwards the contextual request to one or more DSPs 150. In this particular example, and for simplicity, the SSP 170 forwards the contextual request to a single DSP 150. For example, SSP 170 can forward the contextual request to DSP 150. In this example, DSP 150 has digital components and selection values mapped to the digital components, or can determine a selection value for a digital component using the contextual signals.

In stage D, the one or more DSPs 150 return selection values in response to the contextual request. For example, DSP 150 returns one or more selection values mapped to digital components responsive to the contextual request. DSP 150 can return any number of selection values responsive to the contextual request. In some implementations, DSP 150 can additionally return selection values responsive to a digital component request based on sensitive information, such as user group information. These selection values are "conditional selection values" because they are conditioned on sensitive information, and thus are conditioned on the MPC cluster 130 receiving a request that includes sensitive information matching the sensitive information on which the selection values are conditioned. For each selection value that DSP 150 provides, DSP 150 includes information such as a time-to-live (TTL) parameter, i.e. the maximum timespan that the MPC cluster 130 may cache the selection value. This TTL parameter enables the MPC cluster 130 to cache selection values received from DSP 150. In some implementations, without a TTL parameter, the MPC cluster 130 does not cache received selection values, and instead will discard the selection values after the selection values have been used in a selection process, e.g., in the selection process corresponding to the digital component request transmitted in stages A, B and C.

When vectors are used to determine the selection value, the DSP 150 can generate and return a second vector of values. The DSP 150 can generate the second vector of values based on the contextual signals of the digital component request transmitted in stage B and C. The second vector can be referred to as a contextual vector. The contextual vector can include the same elements corresponding to the same features as the user group-based vector. However, the DSP 150 can determine the values of the contextual vector for the current digital component request based on the contextual signals of the digital component request. In contrast, the values of the user group-based vector of the DSP 150 is stored as the MPC cluster 130 and is determined ahead of time, e.g., based on the user group(s) corresponding to the user group-based vector.

For each DSP 150 that provides a contextual vector, the MPC cluster 130 can determine the selection value for each stored digital component of the DSP 150 by determining a dot product of the user group-based vector and the contextual vector provided by the DSP 150. If the DSP 150 has multiple user group-based vectors stored by the MPC cluster 130, e.g., each for a different digital component, the MPC cluster 130 determine, for each user group-based vector, the dot product of the contextual vector and the user group-based vector.

In some implementations, a third vector can be used based on a user profile of the user for which the digital component request is submitted. This vector can have the same dimensions and features as the other vectors, but with values based on a user profile for the user.

For example, the value for a location element for Austin in the user profile vector can have a positive value if the user is in Austin or a negative value or value of zero if the user is not in Austin; the value for the same location element in the contextual vector can have a positive value if the publisher content currently shown to the user is highly relevant to Austin; the value for the same location element in the user group-based vector for the digital component is positive if the digital component is relevant to Austin. To calculate the dot product of three vectors, the computing systems $MPC_1$ and $MPC_2$ first perform element-wise multiplication among corresponding elements, one from each of the three vectors, then sum the result. For example, assuming that the three vectors are $V_1=\{v_{1,1} \ldots v_{1,n}\}$, $V_2=\{v_{2,1} \ldots v_{2,n}\}$ and $V_3=\{v_{3,1} \ldots v_{3,n}\}$ respectively, the dot-product among the three vectors would be $\Sigma_{i=1}^{n} v_{1,i} \times v_{2,i} \times v_{3,i}$.

In stage E, the SSP 170 applies content selection rules to digital components corresponding to conditional selection values. As described above, these conditions can be based on user group identifiers, frequency control, blocked (e.g., muted) digital components, pacing, and/or k-anonymity.

SSP 170 also applies selection value rules to determine, for example, how selection values affect post-publishing values for particular content providers. Post-publishing values can indicate, for example, an amount that is provided to a publisher 140 for displaying the digital component with a resource or application content of the publisher 140. The SSP 170 then performs a selection process to determine a top unconditional selection value, the unconditional selection value that yields the highest post-publishing value. An unconditional selection value is not conditioned on sensitive information, and therefore content selection rules such as budget and pacing rules, advertiser and digital component exclusion can be applied by the SSP 170 rather than by the MPC cluster 130. The SSP 170 then forwards the following, which are JIT selection values, to the MPC cluster 130: all selection values that enable caching in the MPC cluster 130 (selection values having TTL values) and all selection values whose post-publishing value is no less than the post-publishing value of the top unconditional selection value.

In stage F, the MPC cluster 130 updates its cache with JIT selection values received that enable caching (i.e., have TTL values). In addition, the MPC cluster 130 applies selection rules, such as user group membership rules, frequency control, pacing rules, and rules to prevent micro-targeting of a particular user to all selection values received in stage E, as well as to previously cached selection values to select valid candidates for the selection process. The rules can include restrictions and guidelines on the manner or frequency of distribution of a digital component, among other factors. The rules include frequency control, muting, resource depletion, and pacing constraints. In some implementations, the JIT digital components that have conditions that are evaluated by the MPC cluster 130 can be ignored for the current digital component selection process. For example, ignoring these digital components for the current selection process can provide performance benefits, e.g., reduced latency in selecting and providing a digital component. The MPC cluster 130 then runs the final selection process among all eligible candidates, selects a winning selection value, and then returns data for a digital component mapped to the winning selection value to the application 112 in response to the digital component request.

In stage G, the digital component mapped to the winning selection value is rendered by application 112. Application 112 then provides an impression notification to the MPC cluster 130. This impression notification includes data that allows the MPC cluster 130 to update information relevant to updating parameters that allow the MPC cluster 130 to enforce selection rules for future digital component requests, e.g., received in subsequent occurrences of stage A. In some implementations, application 112 may send the impression notification G to MPC cluster 130 by piggy-back on top of a future component request A to reduce the number of network communications and battery/bandwidth consumption for mobile devices, as well as processing/computational costs for the MPC cluster 130.

Figure 3:
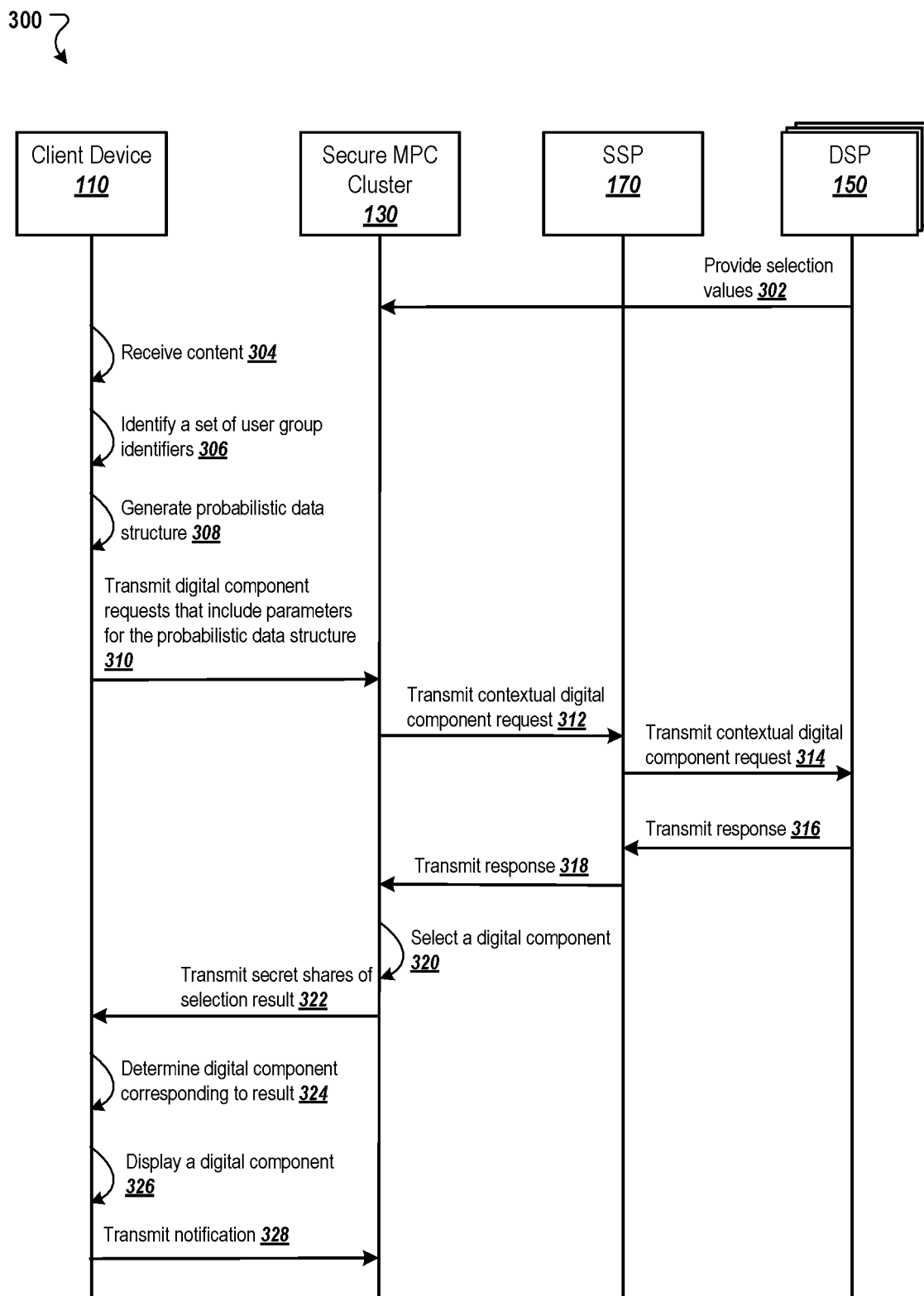
FIG. 3 is a diagram of an example process for selecting a digital component for distribution to a client device.

FIG. 3 is a swim lane diagram of an example process 300 for selecting a digital component for distribution to a client device. Operations of the process 300 can be implemented, for example, by the client device 110, the computing systems MPC1 and MPC2 of the MPC cluster 130, and DSPs 150. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computing system MPC cluster 130, MPC clusters having more than two computing systems can also be used to perform similar processes. In addition, operations of the process 300 can be implemented by SSPs 170.

The example process 300 can include variations, such as tiers, boosts, first value selection processes (e.g., first price auctions), second value selection processes (e.g., second price auctions), and floors. Each of these variations are described with reference to FIGS. 3-5.

In general, a boost is an amount by which a selection value for a digital component is adjusted. For example, a content publisher can instruct an SSP 170 to give a specific DSP 150 a boost of a specified amount "x" when a digital component is being selected for display with one of the publisher's resources 145 or application content. If the DSP 150 submits a selection value of "y," the selection value used in the digital component selection process would be x+y. However, the DSP 150 would only be required to provide an amount no greater than y in a first or second selection value process if the digital component is selected. In the process 300, the MPC cluster 130 can apply the boost to selection values according to information provided by the SSP 170. For example, each SSP 170 can provide information that maps boosts to DSP 150 and publisher 140 pairs. That is, the information can indicate that a particular DSP's selection values should be boosted by a particular amount for digital component selection processes that are selecting a digital component for display with content of a particular publisher. In some implementations, the SSP/publisher can support boost at a more granular level. For example, for each lookup key (e.g., for each set of contextual signals), the SSP/publisher can specify a boost.

An SSP 170 can instruct the secure MPC cluster 130 to split DSPs 150 into multiple tiers with different priorities. Rather than select the digital component corresponding to the highest selection value among all candidate digital components in a digital component selection process, the digital component having the highest selection value in the highest priority tier is selected. To illustrate, consider an example in which there are two tiers, a highest tier and a lowest tier. If there are one or more candidate digital components in the highest tier, the candidate digital component with the highest selection value in the highest tier would be selected even if a candidate digital component in the lowest tier had a selection value that is higher than the selection value of all of the candidate digital components in the highest tier.

The primary difference between a first value selection process and a second value selection process is the clearing amount for the selected digital component. The clearing amount is the amount required to be provided by the DSP 150 to the publisher 140 and/or SSP 170 for the display of the digital component. The same digital component would be selected using both processes. In a first value selection process, the DSP 150 would be required to provide, to the publisher 140 and/or SSP 170, an amount equal to the selection value submitted by the DSP 150. In a second value selection process, the DSP 150 would be required to provide an amount based on the next highest selection value instead. If tiers are used with a second selection value process, the next highest value would be the next highest value in the same tier as the selected digital component. If there is no such candidate digital component in the same tier, the next highest value can be a minimum value for the digital component selection process.

A selection value floor can indicate a minimum selection value that a publisher 140 is willing to accept for display of a digital component. A publisher 140 can specify selection value floors for various DSPs 150, for each category of digital components (e.g., one floor for digital components related to cars and another for digital components related to gardening), for each digital component provider 160, for each brand, for each page on the publisher's site, for each digital component slot, for a group of digital component slots, and/or for other types of groups of digital components. In some implementations, the SSP 170 can set the floor on behalf of the publisher 140 either in advance, or for each digital component request, e.g., of stage A.

The DSPs 150 provide selection values and additional information (e.g., selection criteria such as conditions) for digital components to the MPC cluster 130 (302). In some implementations, the DSPs 150 provide the selection values and additional information to the MPC cluster 130 via the SSP (not shown in FIG. 3 for brevity). For example, the DSPs 150 can provide the selection values and additional information in response to digital component requests and designate the digital components corresponding to the selection values as stored digital components that should be stored at the MPC cluster 130.

The MPC cluster 130 can store the selection values and selection criteria for future digital component requests received from client devices 110. For each digital component, a DSP 150 can also upload additional data, e.g., metadata, for the digital component. The additional information for a digital component can include one or more conditions (and parameters for the condition(s)) that must be satisfied in order for the digital component to be included in a digital component selection process. For example, the additional information can include one or more user group identifiers for user groups corresponding to the digital component.

The additional information for a digital component can include contextual selection signals that indicate the context for which the digital component is eligible, e.g., location of client device 110, spoken language selected for the application 112, URLs for resources with which the digital component can be presented and/or excluded URLs for resources with which the digital component cannot be presented. This additional information for a digital component can also identify the digital component, e.g., using a unique identifier, a domain from which the digital component can be obtained, and/or other appropriate data for the digital component. This additional information can be included as metadata for the digital component.

In some implementations, the MPC cluster 130 caches, or otherwise stores, selection values, selection criteria and other information for digital components provided to the MPC cluster 130 for digital component requests. In this example, the contextual signals for the digital component and the selection value can include the contextual signals included in the digital component request. As described above, the selection values and metadata can be stored in a two stage LUT.

In some implementations, a DSP 150 can provide a user group-based vector of values for a digital component instead of a static selection value for the digital component. In such examples, the user group-based vector of values can be stored in place of the selection value.

The client device 110 receives content (304). For example, the client device 110 can receive an electronic resource (e.g., web page) for display by a web browser or application content for display by a native application. The content can include one or more digital component slots that include computer-readable code, e.g., scripts, that, when executed, cause the client device 110 to request a digital component for each slot. The client device 110 can render the content on a display of the client device 110.

The client device 110 identifies a set of user group identifiers (306). The set of user group identifiers can be the user group identifiers for the user groups that include the user as a member. For example, the set of user group identifiers can be the user group identifiers in the user group list. The application 112 that renders the content or a trusted program can identify the set of user group identifiers, e.g., by accessing the user group list from secure storage of the client device 110.

The client device 110 generates a probabilistic data structure (308). To securely and efficiently generate a digital component request based on sensitive information, the application 112 can use probabilistic data structures, such as a cuckoo filter or a Bloom filter. In this example, the probabilistic data structure is a cuckoo filter. An example of using a Bloom filter is described with reference to FIG. 8. In general, a cuckoo filter includes an array of buckets where each bucket can hold b fingerprints. The fingerprint of an item is a bit string derived from the hash of that item. A cuckoo filter uses n hash functions that allows an item to be placed inn different buckets in any of the b positions. Typically, a cuckoo filter is identified by the number of fingerprints in each bucket and the number of buckets. For example, a (2, 4) cuckoo filter has 2 buckets and each bucket in the cuckoo array can store up to 4 fingerprints. Therefore, the total capacity of the cuckoo filter is 2×4 or 8 fingerprints.

Depending on the configuration of the cuckoo filter, an item can be inserted into a cuckoo filter in one of N possible locations, e.g. N=2. The application 112 uses N pseudo random functions (PRF) parameterized by a user group identifier or an identifier from the set of blocked identifiers and either of two random variables generated by the application 112 to determine all possible locations for the item to be inserted. For example, assume that the two random variables generated by the application 112 are rand_var1$a$ and rand_var1$b$. In some implementations, the application 112 and the MPC cluster 130 agree on a PRF in advance, where $PRF(x,y) \in [0, 2^k-1]$ where k is the number of bits in each item in a bucket of the cuckoo filter.

Each location of the cuckoo filter can be occupied by a user group identifier or a blocked identifier, or empty. The blocked identifiers are identifiers for which the application 112 is blocking digital components, e.g., based on frequency controls or for which the user selected to block digital components for the user group. The application 112 can generate a cuckoo filter table whose elements are PRF (ug_id, rand_var1$a$), PRF(blocked_uid, rand_var1$b$), and 0, where ug_id is the identifier of the user group generated by applying HMAC on the label of the user group based on the domain of the content provider, blocked_uid is an identifier from a set of blocked identifiers, and 0 represents an empty item. The process is repeated on all user group identifiers. In some implementations, the same probabilistic data structure, e.g., cuckoo filter or Bloom filter, can store both user group identifiers and blocked identifiers. In other implementations, user group identifiers and blocked identifiers are stored in dedicated probabilistic data structures.

The application 112 can generate a vector B based on a cuckoo filter table generated for the user group identifiers and/or blocked identifiers. Each value $B_i$ in the vector B can be represented as $B=(A_i-PRF(rand\_var2, i))$ mod p where A is the cuckoo filter table and i is the index of the vector B and cuckoo filter table A. When the application 112 initiates a request for a digital component for a digital component slot, the application 112 transmits rand_var1$a$, rand_var1$b$ and rand_var2 as parameters of the request to computing system MPC1. The application 112 also transmits the vector B, rand_var1$a$ and rand_var1$b$ as parameters of the request to computing system MPC2. PRF(rand_var2, i) and $B_i$ are two additive secret shares of $A_i$ in $Z_p$, held by computing systems MPC1 and MPC2 respectively. Because neither of the computing systems MPC1 and MPC2 have access to both the secret shares, neither of the computing systems can recreate the cuckoo filter table, preserving user privacy.

The client device 110 transmits, to the MPC cluster 130, digital component requests that include the parameters for the cuckoo filter (310). For example, the client device 110 can transmit, to computing system MPC1, a digital component request that includes rand_var1$a$, rand_var1$b$ and rand_var2. The client device 110 can also transmit, to computing system MPC2, a digital component request that includes vector B, rand_var1$a$ and rand_var1$b$. Both digital component requests can also include contextual signals, e.g., the URL of the electronic resource, the number of digital component slots of the resource, the geographic location of the client device 110, and/or other appropriate contextual signals, e.g., lookup key, that can be used to select a digital component.

The MPC cluster 130 transmits a contextual digital component request to the SSP 170 (312). This digital component request can include the contextual signals, but not sensitive user data, such as user group identifiers that identify user groups that include the user as a member. In some implementations, the contextual digital component request was generated by the SSP's tags on the publisher's page rendered on client device 110. The application 112 sends the contextual digital component request to the SSP 170, via the MPC cluster 130, by piggyback on the digital component request sent in operation 310. In some implementation, the application 112 encrypts the contextual digital component request using a public key of the SSP 170, and sends the encrypted contextual digital component request to the SSP 170 by piggy-back on the digital component request sent in operation 310, such that nobody but the SSP 170 can decrypt the contextual digital component.

The SSP 170 transmits the contextual digital component request to one or more DSPs 150 (314). Each DSP 150 can respond to a request with one or more conditional selection values for digital components and/or one or more unconditional selection values for digital components. For each digital component, the response can include data identifying the digital component, the selection value for the digital component, and metadata (or other additional information) for the digital component. For example, the response can include a digital component information element dc_information_element for each digital component. Each DSP 150 can select one or more digital components for inclusion in the digital component selection process based on the contextual signals and determine or identify a selection value for each selected digital component. In some implementations, a DSP 150 can generate a contextual vector for each of one or more digital components based on the contextual signals.

Each DSP 150 can transmit its response to the SSP 170 (316). The SSP 170 can transmit the responses to the MPC cluster 130 (318). In some implementations, the SSP 170 can apply one or more floors for the digital component selection process prior to transmitting the responses to the MPC cluster 130. The SSP 170 can apply the floor(s) based on the publisher 140 of the electronic resource for which the digital component is being selected. As described above, a publisher 140 can specify floors for DSPs 150, categories of digital components, digital component providers 160, brands, and/or for other types of groups of digital components.

The SSP 170 can identify the floors specified by the publisher 140 and apply them to the selection values received from the DSPs 150. If a selection value is less than the corresponding floor, the SSP 170 can remove the selection value from the digital component selection process, e.g., by not providing the selection value to the MPC cluster 130. For example, assume that the publisher 140 specified a floor of five units for a given digital component provider 160. If the DSP 150 provided a selection value of four units for a digital component of the given digital component provider 160, the SSP 170 can filter the selection value from the digital component selection process.

As described above, the DSPs 150 can provide selection values for stored digital components that are to be stored for use in digital component processes in the future. If these selection values do not satisfy the corresponding floor(s), the digital components and their associated selection values are not stored at the MPC cluster 130 as the SSP 170 does not forward them to the MPC cluster 130.

In some implementations, the MPC cluster 130 enforces the floors rather than, or in addition to, the SSP 170. As the MPC cluster 130 computes the dot product of the vectors when vectors are used to determine the selection values, the MPC cluster 130 can enforce the floors on these selection values. The MPC cluster 130 can also enforce the floors on static selection values, e.g., rather than the SSP 170.

The MPC cluster 130 performs a secure MPC process to select a digital component to provide for display at the client device 110 (320). This selection can include identifying a set of digital components and their corresponding selection values that are eligible for the digital component selection process based on contextual signals, e.g., using a lookup key, such as a first stage lookup key described above with reference to FIG. 1. This can also include identifying, from the set of digital components, candidate digital components that are candidates for selection. The candidate digital components can include the unconditional digital components for which the DSPs 150 provided selection values and conditional digital components for which each condition of the digital component is satisfied. A conditional digital component is only considered a candidate for a digital component selection process when all conditions of the digital component are satisfied.

The MPC cluster 130 can select, from the candidate digital components, a digital component to provide to the client device 110 in response to the digital component request based on the selection values for the candidate digital components. For digital components having a selection value determined using vectors, the MPC cluster 130 can determine the selection value for the digital component by determining a dot product of the vectors, e.g., the user group-based vector, the contextual vector, and optionally a user profile vector.

In selecting the digital component, the MPC cluster 130 can also consider any tiers or boosts for the digital components. As described above, a publisher 140 can establish tiers and/or boosts for DSPs 150 and/or digital component providers 160. When the publisher 140 for which the digital component is being selected has established boosts, the MPC cluster 130 (or the SSP 170) can adjust the selection value for digital components for DSPs 150 and/or digital component providers 160 using the corresponding boost specified by the publisher 140. If vectors are used to determine a selection value, the MPC cluster 130 can adjust the selection value after the selection value is determined by computing the dot product of the vectors.

When tiers are used, the MPC cluster 130 can perform a selection process for each tier, e.g., sequentially from the highest priority tier to the lowest priority tier or in parallel.

The MPC cluster 130 can select the digital component having the highest selection value in the highest priority tier that includes at least one candidate digital component. For example, if none of the digital components in the highest priority tier are a candidate, e.g., that satisfies all of its conditions for inclusion in the digital component selection process, the MPC cluster 130 selects a candidate from the next highest priority tier that includes a candidate.

The MPC cluster 130 can perform the selection process for each tier in parallel to improve the speed at which the selection process is performed. In this way, if there are no candidates in the highest priority tier, the MPC cluster 130 has already started and may have completed the selection process for each other tier so that a final digital component can be selected.

Figure 4:
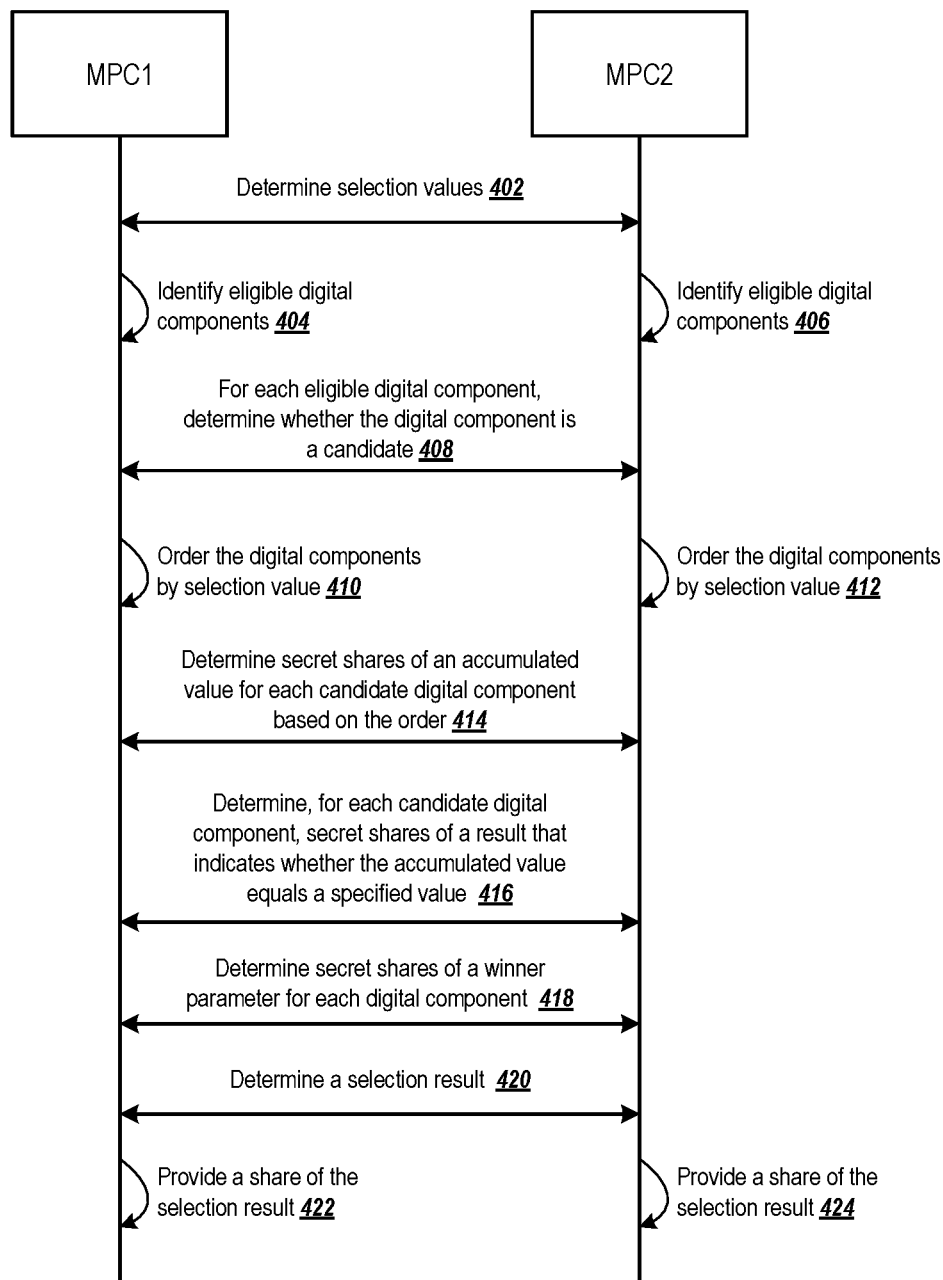
FIG. 4 is a diagram of an example process for selecting a digital component for distribution to a client device.

The MPC cluster 130 can perform the selection processes sequentially from highest priority tier to the lowest priority tier. If speed is not as critical, this can reduce wasted computations performed for lower priority tiers if a higher priority tier includes a candidate digital component. An example process for selecting a digital component using a secure MPC process is illustrated in FIG. 4 and described below.

The MPC cluster 130 transmits secret shares of a selection result to the client device 110 (322). In some implementations, the MPC cluster 130 can also send a selection process identifier for the digital component selection process to the client device 110. The selection process identifier can uniquely identify the digital component selection process for which the selection result was generated. For example, the computing systems MPC1 and MPC2 can each generate a respective selection process identifier SPID for each digital component request for which the computing systems MPC1 and MPC2 perform a selection process to generate a selection result to provide to a client device 110. In some implementations, the selection process identifier SPID can be a nonce or an opaque alphanumeric or numeric sequence.

The MPC cluster 130 can also store data for the selection values that were part of the selection process keyed by, or otherwise linked to, the SPIDs. For example, computing system MPC1 can store a table or other data structure that includes data for the selection values with a key that is based on the $SPID_1$ generated by computing system MPC1 for the selection process. Similarly, computing system MPC2 can store a table or other data structure that includes data for the selection values with a key that is based on the $SPID_2$ generated by computing system MPC2 for the selection process. This enables the MPC cluster 130 to update the process variables for the feedback controllers based on data received from the client device 110.

The selection result can be in the form of a byte array that includes information about the selected digital component. For example, the selection result can be a byte array that includes the value for the digital component in the second LUT, e.g., the selection value for the digital component and the metadata for the digital component. The computing systems MPC1 and MPC2 can determine, using the secure MPC process, the secret shares of the selection result, as described in more detail below. The computing system MPC1 can transmit a first secret share of the selection result to the client device 110 and the computing system MPC2 can send a second secret share of the selection result to the client device 110. To prevent the computing systems MPC1 and MPC2 knowing the selected digital component, the computing systems MPC1 and MPC2 can be prevented from sharing their secret shares of the selection result with each other.

The client device 110 determines a digital component that corresponds to the selection result(s) (324). For each selection result for which the client device 110 receives two secret shares from the computing systems MPC1 and MPC2, the client device 110 can determine the selection result from the two secret shares. For example, using an additive secret share library as described in more detail below, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc.

The client device 110 displays a digital component (326). For example, the application 112 can display the digital component with the content received in step 304. In some implementations, the client device 110 can display the digital component of the selection result.

In some implementations, the client device 110 can request a digital component based on user group membership from the MPC cluster 130. The client device 110 can also request digital components based on contextual signals from an SSP 170. These contextual signals can include the same contextual signals described above, and optionally additional contextual signals such as the number of digital component slots of the resource, the types of digital component slots, the types and/or format of digital components that can be displayed with the resource, etc. The SSP 170 can select one or more digital components based on the contextual signals and selection values for the digital components and provide one or more of the selected digital components (or data identifying the digital components) and the selection values for the digital component(s) to the client device 110. The client device 110 can then select, from a set of digital components that include the digital component of the selection result received from the MPC cluster 130 and the digital component(s) selected by the SSP 170, a digital component to display with the resource. If a resource includes multiple digital component slots, the client device 110 can request a respective digital component for each slot from the MPC cluster 130 and from the SSP 170.

The client device 110 can transmit one or more event notifications to the MPC cluster 130 (328). For example, assuming that a digital component of selection result received from the MPC cluster 130 is displayed by the application 112 of the client device 110, the application 112 can transmit an impression notification for a digital component in response to displaying the digital component. In another example, the application 112 can transmit a user interaction notification in response to detecting user interaction, e.g., a selection/click of the digital component.

For user interaction notifications, the application 112 can generate secret shares of a clicked parameter clicked that is a Boolean parameter that can have a value of one if the user interacted with the digital component, or a value of zero if the user did not interact with the digital component within a specified duration of time after the digital component was displayed. Thus, in this example, either value indicates that the digital component was displayed, but a value of one can indicate that the user interacted with the digital component. The application 112 can send, to computer system MPC1, a first notification that includes the $SPID_1$ received from computing system MPC1 and a first secret share [$clicked_1$] of the clicked parameter. Similarly, the application 112 can send, to computer system MPC2, a second notification that includes the $SPID_2$ received from computing system $MPC_2$ and a second secret share [clicked$_2$] of the clicked parameter. In another example, the notification can separately indicate whether the digital component was displayed at the client device 110, e.g., using secret shares similar to the clicked parameter.

The impression and user interaction notifications enable the MPC cluster 130 to update the process variables for a feedback controller used to pace the distribution of the digital component. For example, if the process variable is an impression rate, the MPC cluster 130 can use the impression notification to update a count of the impressions of the digital component (or campaign that includes the digital component). If the process variable is a user interaction rate, the MPC cluster 130 can use the clicked parameter to update a number of user interactions for the digital component (or campaign that includes the digital component). In a particular example, computing system MPC1 can use the SPID$_1$ to obtain the stored data for the selection process and computing system MPC2 can use the SPID$_2$ to obtain the stored data for the selection process. The MPC cluster 130 can then perform a secure MPC process to update the process variables (e.g., impression rate, interaction rate, conversion rate, and/or resource depletion rate) for the campaign of the digital component that was displayed by the application 112. Similarly, the MPC cluster 130 can use the notifications to update counts used to determine whether a digital component satisfies a k-anonymity condition.

FIG. 4 is a swim lane diagram of an example process 400 for selecting a digital component for distribution to a client device. Operations of the process 400 can be implemented, for example, by the computing systems MPC1 and MPC2 of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400.

The process 400 can be used for first value selection processes, second value selection processes, and/or selection processes that include boosts and/or floors. Each of these variations are described below. Another example process 500 illustrated in FIG. 5 can be used for selection processes that include tiers. The process 500 can also support first value selection processes, second value selection processes, boosts, and/or floors.

The computing systems MPC1 and MPC2 determine, and/or identify, selection values for digital components (402). The computing systems MPC1 and MPC2 can determine the selection values in response to a digital component request received from a client device 110. As described with reference to FIG. 3, computing system MPC1 can receive, from the client device 110, a digital component request that includes contextual signals and data for a probabilistic data structure that represents user group identifiers for the user of the client device 110. The data for the probabilistic data structure can include parameters rand_var1$a$, rand_var1$b$ and rand_var2. Similarly, computing system MPC2 can receive, from the client device 110, the contextual signals and the parameters vector B, rand_var1$a$ and rand_var1$b$. The contextual signals can be in the form of a lookup key, e.g., the first stage lookup key (SHA256(UG_Request_Key)) described with reference to FIG. 1.

The selection values can include selection values for stored digital components for which data is stored by each computing system MPC1 and MPC2 and JIT selection values received for the digital component selection process from an SSP 170. For situations in which the selection values are determined using vectors, each computing system MPC1 and MPC2 can determine the selection values by determining the dot product of the vectors for the digital component. The computing systems MPC1 and MPC2 can also apply any boosts for digital components for which the publisher 140 or SSP 170 has established a boost and/or enforce any floors established by the publisher 140 or SSP 170.

The computing system MPC1 identifies eligible digital components (404). The computing system MPC1 can identify eligible digital components for a digital component request received from a client device 110, e.g., as described with reference to FIG. 3. An eligible digital component is a digital component that is eligible for selection based on the contextual signals of the digital component request. For example, an eligible digital component can be a digital component having a set of contextual signals that match contextual signals of the digital component request, e.g., a digital component having a lookup key that matches the lookup key of the request.

In implementations in which a two stage LUT is used, the computing system MPC1 can identify the eligible digital components using the first stage lookup key of the digital component request. The computing system MPC1 can access the first stage LUT and use the first stage lookup key to identify the rows of the second stage LUT that include information for digital components that are eligible to displayed, e.g., for which a selection value has been received, for the set of contextual signals represented by the first stage lookup key. For example, as described above, each row of the second stage LUT includes information for a digital component and a second stage lookup key that is based on a set of contextual signals. Thus, the computing system MPC1 can use the first stage lookup key to identify rows of the second stage LUT that have a set of contextual signals that match the set of contextual signals defined by the first stage lookup key received in the digital component request. These rows include information for digital components that are eligible to be displayed or have eligible selection values for the context defined by the first stage lookup key received in the digital component request.

The computing system MPC2 identifies eligible digital components (406). The computing system MPC2 can identify eligible digital components for a digital component request received from a client device 110. The computing system MPC2 can identify eligible digital components in a similar manner as computing system MPC1. In implementations in which the MPC cluster 130 enforces floors, each MPC computing system MPC1 and MPC2 can filter, from the eligible digital components, any eligible digital component that has a selection value that does not satisfy, e.g., that does not meet or exceed, its corresponding floor.

For each eligible digital component, the computing systems MPC1 and MPC2 determine whether the digital component and its selection value is a candidate for being selected for distribution to the client device 110 in response to the digital component request (408). The candidate digital components are the eligible digital components that satisfy all of the one or more conditions for the digital component, if the digital component is a conditional digital component. Each unconditional digital component that is eligible based on context is also a candidate digital component. The computing systems MPC1 and MPC2 can determine the candidate digital components using a secure MPC process such that neither computing system MPC1 or MPC2 can identify the candidate digital components in cleartext.

For user group membership conditions, the computing systems MPC1 and MPC2 can calculate respective secret shares of a user group membership condition parameter ug_check$_i$ for each eligible digital component "1." The first secret share of the user group membership condition parameter ug_check$_i$ maintained by the computing system MPC1 can be represented as [ug_check$_{i,1}$] and the second secret share of the user group membership condition parameter ug_check$_i$ maintained by the computing system MPC2 can be represented as [ug_check$_{i,2}$]. Brackets are used to represent secret shares of parameters.

For implementations in which a cuckoo filter is used to represent the user group membership for a user, the computing system MPC1 calculates, in collaboration with computing system MPC2, [ug_check$_{i,1}$] according to relationship 1 below:

$$0 == \Pi_{i=1}^{N}([M_{F_i(ug\_id(x)),1}] - PRF(ug\_id(x), rand\_val1a))$$
$$AND\ 0 \neq \Pi_{i=1}^{N}([M_{F_i(block\_id(x)),1}] - PRF(block\_id(x), rand\_val1b))$$

In relationship 1, $\Pi$ denotes the multiplication of multiple items. Here, ug_id(x) is a function used to retrieve the user group identifier ug_id associated with a selection value x, $\{F_1, \ldots F_N\}$ is a set of hash functions to calculate possible index of an item within the cuckoo filter table A, and rand_val1a is the random value received in the digital component request. $[M_{x,1}]$ is the x-th element in the array $[M_1]$. == is the equality test between a cleartext integer and a secret share of a secret integer. The result of == is a secret share of a secret integer that is either 0 (not equal) or 1 (equal). Here, the value of $[M_{i,1}]=[PRF(rand\_val1a, i)_1]$.

Similarly, computing system MPC2 calculates, in collaboration with computing system MPC2, [ug_check$_{i,2}$] according to relationship 2 below:

$$0 == \Pi_{i=1}^{N}([M_{F_i(ug\_id(x)),2}] - PRF(ug\_id(x), rand\_val1a))$$
$$AND\ 0 \neq \Pi_{i=1}^{N}([M_{F_i(block\_id(x)),2}] - PRF(block\_id(x), rand\_val1b))$$

Here, the value of $[M_{i,2}]=B_i$.

For digital components that are conditioned on user group membership of the user for which a digital component is being selected, the computing systems MPC1 and MPC2 can calculate the secret shares [ug_check$_{i,1}$] and [ug_check$_{i,2}$] of the user group membership condition parameter ug_check$_i$. The combination of the two secret shares can be a Boolean value representing whether the user is a member of the user group corresponding to the digital component. For example, a value of one can represent that the user is a member and a value of zero can represent that the user is not a member. For digital components that are not conditioned on user group membership of the user, the computing systems MPC1 and MPC2 can use default values for the secret shares [ug_check$_{i,1}$] and [ug_check$_{i,2}$] such that the combination has a value (e.g., one) indicating that the user is a member of the user group corresponding to the digital component.

In implementations in which a Bloom filter is used to represent the user group membership of a user, the computing systems MPC1 and MPC2 can query the Bloom filter as described with reference to FIG. 8. The result is that computing system MPC1 has, for each hash function of the Bloom filter, a first secret share [ug_check$_{i,1}$] of the user group membership condition parameter. Similarly, computing system MPC2 has, for each hash function of the Bloom filter, a second secret share [ug_check$_{i,2}$] of the user group membership condition parameter. For a digital component to satisfy the user group membership condition, the user group membership condition parameter, i.e., ug_check$_i$, for each hash value of the Bloom filter would need to have a Boolean value of true, or one. The secret shares for each hash value can be included in the final calculation of the secret shares of the candidate parameter for the digital component.

The computing systems MPC1 and MPC2 can also collaborate to calculate respective secret shares [blocked_check$_{i,1}$] and [blocked_check$_{i,2}$] of a blocked digital component parameter blocked_check$_i$ for each digital component i that is conditioned on frequency controls or muting. The combination of the two secrets shares can be a Boolean value representing whether the digital component satisfies the blocked digital component condition based on frequency controls (e.g., the digital component has not been provided to the user more than a threshold number of times during a duration of time) and/or based on whether the user selected to not have the digital component displayed to the user. For example, a Boolean value of true or a value of one can represent that the digital component can be displayed to the user based on these factors and a Boolean value of false or a value of zero can represent that the digital component cannot be displayed to the user based on these factors.

To determine the secret shares of the blocked digital component parameter, the computing systems MPC1 and MPC2 can use shares, e.g., arrays, of a Bloom filter that represents identifiers for blocked digital components. The application 112 can generate a Bloom filter that represents the identifiers for the blocked digital components and send data representing the Bloom filter to the computing systems MPC1 and MPC2, as described with reference to FIG. 8. The computing systems MPC1 and MPC2 can then query the Bloom filter using arrays representing the Bloom filter to obtain the secret shares [blocked_check$_{i,1}$] and [blocked_check$_{i,2}$], as described with reference to FIG. 8.

The computing systems MPC1 and MPC2 can also collaborate to calculate respective secret shares [pacing_check$_{i,1}$] and [pacing_check$_{i,2}$] of a pacing control check parameter pacing_check$_i$ for each digital component i that is paced, e.g., using a feedback controller. The combination of the two secrets shares can be a Boolean value representing whether the digital component satisfies the pacing condition, e.g., based on the output of the feedback controller. For example, if the digital component is being provided too frequently in relation to the target impression rate, the output of the feedback controller can indicate that the digital component is not eligible for this digital component selection process. A Boolean value of true or a value of one can represent that the digital component satisfies the pacing condition, e.g., is not being throttled for this selection process, and a Boolean value of false or a value of zero can indicate that the digital component does not satisfy the pacing condition, e.g., is being throttled for this selection process.

To enforce resource depletion (e.g., budget) and pacing rules, the computing systems MPC1 and MPC2 can randomly block a digital component from participating in the digital component selection process using a probability that is determined using the feedback controller and a resource depletion condition. If a campaign that includes a digital component does not have any additional resources, the probability is set to one. Otherwise, if the campaign is ahead of the delivery schedule, the probability is set high (e.g. above zero and close to one) such that the computing systems MPC1 and MPC2 are more likely to block the digital component from the digital component selection process, e.g., by calculating secret shares [pacing_check$_{i,1}$] and [pacing_check$_{i,2}$] such that the pacing control check parameter pacing_check$_i$ has a value of zero. If the campaign is behind the delivery schedule, the probability is lower.

The computing systems MPC1 and MPC2 can periodically calculate a pacing selector parameter pacing_selector for each campaign in additive secret shares using the feedback controller. Conceptually, the pacing selector parameter is the throttling probability, scaled up by a factor of a maximum range.

For each digital component request and each digital component, the computing systems MPC1 and MPC2 calculate a secret number uniformly distributed in [0, maximum range]. If the random number is less than or equal to the pacing selector parameter pacing_selector, the computing systems MPC1 and MPC2 block the digital component from participating in the digital component selection process, e.g., by calculating secret shares [pacing_check$_{i,1}$] and [pacing_check$_{i,2}$] such that the pacing control check parameter pacing_check$_i$ has a value of zero.

To protect user privacy and confidential information of the participants in the digital component selection process, both the random number and the pacing selector parameter are in additive secret shares. The comparison between two secret shares can be performed using a garbled circuit protocol. By limiting both secret shares to six or seven bits, the comparison protocol may take one or two rounds of communication between the computing systems MPC1 and MPC2.

To determine the pacing selector parameter for a campaign, the computing systems can calculate the amount of resources used for each campaign as resources_used_campaign=$\Sigma$(clearing_value×is_dc_the_winner), where the sum is across all of the digital component selection processes that include the digital component of the campaign, the parameter clearing_value is the clearing value for the digital component selection process, and is_dc_the_winner is the winner parameter for the digital component in the digital component selection process. This computation can be performed in secret shares such that each computing system MPC1 and MPC2 holds a secret share of the amount of resources used. The computing systems MP1 and MPC2 can then calculate a resources exhausted parameter resources_exhausted for the campaign by determining whether the amount of resources used, i.e. resources_used_campaign, is greater than the total amount of resources allocated for the campaign in secret shares.

The computing systems MPC1 and MPC2 can calculate the pacing selector parameter pacing_selector for each campaign as pacing_selector=resources_exhausted×maximum range+(1−resources_exhausted)×output, where the parameter output is the output of the feedback controller. This calculation can use one RPC between the computing systems MPC1 and MPC2 to compute multiplication in secret shares. However, the calculation can be performed offline periodically to prevent any added latency.

The computing systems MPC1 and MPC2 can also collaborate to calculate respective secret shares of [kanonymity_check$_{i,1}$] and [kanonymity_check$_{i,2}$] of a k-anonymity check parameter kanonymity_check$_i$ for each digital component i that must satisfy a k-anonymity condition, which can apply to all digital components in some implementations. The combination of the two secret shares can be a Boolean value representing whether the digital component satisfies the k-anonymity condition. For example, a value of one can represent that the digital component satisfies k-anonymity and a value of zero can represent that the digital component does not satisfy k-anonymity and should be blocked from digital component selection processes.

The computing systems MPC1 and MPC2 can periodically process logs (as described with reference to FIG. 9) to identify digital component selection processes where winner digital components have been shown (or could have been shown) by an application 112, e.g., the corresponding selection process identifier has been received in impression notifications. Among these selection processes, the computing systems MPC1 and MPC2 counts the number of impressions that were shown (or could have been shown) by users' applications 112 as impression_show$_i$=$\Sigma$(is_dc_the_winner_i). Here, i can represent a digital component or a campaign. The computation is performed in secret shares such that each computing system MPC1 and MPC2 have a secret share of the number of impressions impression_show$_i$. The computing systems MPC1 and MPC2 can then determine whether the number of impressions exceeds a value k, e.g., by comparing the number of impressions to k over secret shares.

For each condition of each conditional digital component (e.g., digital components that have at least one condition), each computing system MPC1 and MPC2 can store a corresponding secret share of the parameter for each condition for the digital component. In this way, as long as at least one MPC computing system is honest, neither computing system MPC1 nor MPC2 knows the value of the parameter in cleartext. Each digital component can be conditioned on zero or more of the conditions. For a given digital component selection process, some digital components can have different conditions and/or different quantities of conditions than other digital components.

Although some example conditions are provided above, other conditions can also be used. In general, the computing systems MPC1 and MPC2 can calculate the secret shares of the condition parameters using a secure MPC process. The criteria and techniques for determining the condition parameters can vary. In some implementations, the secret shares of the condition parameters can be received from another computing system, e.g., such that the computing systems MPC1 and MPC2 do not compute the condition parameters.

The computing systems MPC1 and MPC2 can determine whether a conditional digital component is a candidate for the digital component selection process using the secret shares of the condition parameters. The computing systems MPC1 and MPC2 can calculate secret shares of a candidate parameter is_dc_a_candidate$_i$ for each conditional digital component i using the secret shares of the condition parameter(s) for the conditional digital component. In general, if a conditional digital component is conditioned on each of the conditions described above, the candidate parameter for digital component i can be calculated using relationship 3 below:

$$\text{is\_dc\_a\_candidate}_i = \text{ug\_check}_i \text{ AND blocked\_check}_i \text{ AND pacing\_check}_i \text{ AND kanonymity\_check}_i$$

As the value of each condition parameter is in secret shares, the computing systems MPC1 and MPC2 can collaborate in a secure MPC process using round trip Remote Procedure Calls (RPCs) to determine corresponding secret shares [is_dc_a_candidate$_{i,1}$] and [is_dc_a_candidate$_{i,2}$] of the candidate parameter for digital component i using the secret shares of the condition parameters. Any appropriate secret sharing algorithm for determining logical AND operations can be used to determine the secret shares [is_dc_a_candidate$_{i,1}$] and [is_dc_a_candidate$_{i,2}$] of the candidate parameter for digital component i. The computing systems MPC1 and MPC2 can determine the secret shares of the candidate parameter using only the secret shares of the condition parameters for those conditions. As the end of this secure MPC process, computing system MPC1 holds the first secret share [is_dc_a_candidate$_{i,1}$] of the candidate parameter for each conditional digital component and computing system MPC2 holds the second secret share [is_dc_a_candidate$_{i,2}$] of the candidate parameter for each conditional digital component.

In some implementations, the computing systems MPC1 and MPC2 evaluate relationship 3 for each digital component using a garbled circuits protocol. In this example, one of the computing systems MPC1 or MPC2 can construct the garbled circuit. For this example, assume that computing system MPC1 constructs the garbled circuit. Computing system MPC1 knows its own secret shares and also knows that there is only one possible bit pattern that computing system MPC2's secret shares must hold in order for the candidate parameter for the digital component to become true, or one. With such property, computing system MPC1 only needs up to 50 gates to construct the garbled circuit, e.g., if there are a total of about 50 Boolean parameters in relationship 3.

In relationship 3, there is only one user group membership condition parameter ug_check$_i$. However, if a Bloom filter is used to represent the user group membership for a user, relationship 3 can include a respective user group membership condition parameter ug_check$_i$ for each hash function of the Bloom filter. Similarly, if the blocked digital components are represented using a Bloom filter, relationship 3 would include a respective blocked digital component parameter blocked_check$_i$ for each hash function of this Bloom filter. In relationship 3, pacing_check$_i$ is only present if the owner of the digital component enables pacing check.

The computing system MPC1 determines an order of the digital components based on the selection values (410). Similarly, the computing system MPC2 determines an order of the digital components based on the selection values (412). These two orders should be exactly the same because the input to the ordering process is the same on the two computing systems MPC1 and MPC2. Each computing system MPC1 and MPC2 can determine an order of the digital components. Each order can include candidate digital components that were evaluated for candidate eligibility in step 408 and other digital components. For example, the order can include all available digital components that are available for the digital component selection process, all eligible digital components for the digital component selection process (e.g., eligible based on contextual signals), or all digital components in the second stage LUT if one is used. The order can be from the digital component having the highest selection value to the digital component having the lowest selection value. In some implementations, the selection values used for the order can be the value that would be provided to the publisher 140 of the resource with which a selected digital component would be displayed, e.g., after any sharing with a DSP 150 and/or SSP 170, plus any applicable boost.

As the selection values are in cleartext, the computing systems MPC1 and MPC2 do not have to perform any roundtrip computations to determine the order of the digital components. Instead, each computing system MPC1 and MPC2 can order the selection values independently. If the selection values were stored as secret shares at each computing system MPC1 and MPC2, with each computing system MPC1 and MPC2 having a respective secret share of each selection value, the computing systems MPC1 and MPC2 can perform a secure MPC process using roundtrip computations to order the selection values. If there is a tie between two or more selection values, the computing systems MPC1 and MPC2 can break the tie deterministically using other metadata for the digital components corresponding to these selection values.

The computing systems MPC1 and MPC2 determine secret shares of an accumulated value for each candidate digital component (414). Conceptually, the accumulated value for a given digital component represents a total number of candidate digital components from the top of the order to the selection value for the given digital component, excluding the given digital component even if the given digital component is a candidate. That is, the accumulated value represents a number of candidate digital components that are more eligible for selection than the given digital component. This concept is shown in Table 3 below.

TABLE 3

| Ordered Selection Values | is_dc_a_candidate | Accumulated Value (acc) | Is Accumulated Value Equal to 0? |
|---|---|---|---|
| Highest | 0 | 0 | 1 |
| 2$^{nd}$ Highest | 1 | 0 | 1 |
| 3$^{rd}$ Highest | 0 | 1 | 0 |
| 4$^{th}$ Highest | 1 | 1 | 0 |
| ... | ... | ... | ... |

In some implementations, the accumulated value for a given digital component represents a total number of candidate digital components from the top of the order to the given digital component, including the given digital component if the given digital component is a candidate. In this example, the fourth column would represent whether the accumulated value is equal to one rather than zero. For brevity, the remaining discussion will be in terms of the first example in which the accumulated value for a given digital component represents a total number of candidate digital components from the top of the order to the given digital component, excluding the given digital component even if the given digital component is a candidate.

Conceptually, in Table 3, the accumulated value (acc) is incremented for each digital component that has a candidate parameter is_dc_a_candidate equal to one as it progresses from the top of the order to the bottom of the order. As described below, the calculation of the accumulated values acc is performed in secret shares. For example, the accumulated value acc for the digital component having the highest selection value is zero as the candidate parameter is_dc_a_candidate for the highest selection value is equal to zero. The accumulated value acc for the second highest digital component is also zero as the candidate parameter is_dc_a_candidate for the second highest digital component is equal to one but none of the selection values above the second highest digital component has a candidate parameter is_dc_a_candidate equal to one. Moving down the order, accumulated value acc for the candidate parameter is_dc_a_candidate for the third highest selection digital component is incremented to a value of one based on the candidate parameter is_dc_a_candidate for the second highest selection value having a value of one. As the candidate parameter is_dc_a_candidate for the third highest digital component is zero, the accumulated value acc for the fourth digital component is not incremented and has a value of zero like the third highest digital component.

Using Table 3, the computing systems MPC1 and MPC2 would select, for distribution to the client device 110, the digital component corresponding to the selection value for which the overall candidate parameter is_dc_a_candidate has a value of one and the accumulated value acc has a value of zero, as indicated in the fourth column of Table 3. This represents the digital component corresponding to the highest ordered selection value for which the candidate parameter is_dc_a_candidate has a value of one. As the candidate parameter is_dc_a_candidate is in secret shares for the computing systems MPC1 and MPC2 to maintain user privacy and ensure that user data is not leaked, the computing systems MPC1 and MPC2 determine secret shares of the accumulated value acc for each digital component and use roundtrip computations to determine which digital component has an accumulated value acc that is equal to zero and a candidate parameter is_dc_a_candidate that is equal to one.

The computing systems MPC1 and MPC2 can determine their secret shares of the accumulated value acc for each digital component independently without any roundtrip computations in some implementations depending on the secret share algorithm. For example, computing system MPC1 can determine, for each digital component i, a first share $[acc_{i,1}]$ of the accumulated value acc by traversing all of the digital components in order from highest to lowest and summing the candidate parameters is_dc_a_candidate for the digital components along the way, as described above with reference to Table 3. Similarly, computing system MPC2 can determine, for each digital component i, a second share $[acc_{i,2}]$ of the accumulated value acc by traversing all of the digital components in order from highest to lowest and summing the candidate parameters is_dc_a_candidate for the digital components along the way.

The computing systems MPC1 and MPC2 determine, for each digital component, secret shares of a result that indicates whether the accumulated value has a specified value (416). The specified value can be a value of zero, as shown in columns 3 and 4 of Table 3. As described above, the digital component for which the accumulated value is zero and the overall candidate parameter is_dc_a_candidate is one is the digital component having the highest selection value among the candidate digital components.

The computing systems MPC1 and MPC2 can engage in multiple rounds of computations, e.g., multiple RPCs, as part of a secure MPC process to calculate the equality operation $acc_i$==0 in terms of secret shares for each digital component i. The equality operation is used to determine whether the accumulated value $acc_i$ for the digital component i has a value of zero. At the end of this process, computing system MPC1 has, for each digital component i, one secret share of the result $acc_i$==0, and computing system MPC2 has, for each digital component, the other secret share of the result $acc_i$==0.

The computing systems MPC1 and MPC2 determine secret shares of a winner parameter is_dc_the_winner$_i$ for each digital component i (418). The computing systems MPC1 and MPC2 can determine the winner parameters is_dc_the_winner$_i$ based on, for each digital component i, the secret shares of the accumulated value $acc_i$==0 and the secret shares of the candidate parameter is_dc_a_candidate$_i$ for each digital component i. The winner parameter is_dc_the_winner$_i$ for each digital component i can be a Boolean value that indicates whether the digital component i is the winner of the selection process, e.g., whether the digital component i is selected for distribution to the client device 110 in response to the digital component request.

In some implementations, computing system MPC1 and MPC2 can carry out secret share multiplication protocol to calculate, for each selection value, the winner parameter is_dc_the_winner$_i$==(is_dc_a_candidate$_i$×($acc_i$==0)) in terms of secret shares. This can include one RPC between the computing systems MPC1 and MPC2 to multiple two secret shares. At the end of this MPC process, computing system MPC1 has one secret share of the result is_dc_the_winner$_i$ represented as [is_dc_the_winner$_{i,1}$]=[is_dc_a_candidate$_{i,1}$]×([$acc_{i,1}$]==1). Similarly, computing system MPC2 has the other secret share of the result is_dc_the_winner$_i$ represented as [is_dc_the_winner$_{i,2}$]=[is_dc_a_candidate$_{sv,2}$]×([$acc_{i,2}$]==0). Note that for all digital components, at most one digital component has a winner parameter is_dc_the_winner$_i$ that is equal to one, which is the digital component that is selected for distribution to the client device 110. All others would equal zero.

For a first value selection process, computing systems MPC1 and MPC2 can perform a similar process to determine the winner parameter is_dc_the_winner$_i$ for each digital component i. For example, the computing systems MPC1 and MPC2 can perform a secret share equality test to determine secret shares of a first selection value parameter maybe_first_sv$_i$=($acc_i$==0). The first selection value parameter maybe_first_sv$_i$ for digital component i can be a Boolean value that represents whether the selection value for the digital component might be the highest among the candidate digital components. The selection value would only be the highest selection value among the candidate digital components if the digital component corresponding to the selection value is actually a candidate digital component. Thus, the first selection value parameter maybe_first_sv$_i$ for digital component i represents whether the digital component would have the highest selection value if the digital component is actually a candidate digital component. At the end of this equality test, computing system MPC1 has a first secret share [maybe_first_sv$_{i,1}$] of the first selection value parameter maybe_first_sv$_i$ for digital component i and computing system MPC2 has a second secret share [maybe_first_sv$_{i,2}$] of the first selection value parameter maybe_first_sv$_i$ for digital component i.

The computing systems MPC1 and MPC2 can then calculate the winner parameter is_dc_the_winner$_i$ for each digital component i in terms of secret shares using relationship 4 below:

is_dc_the_winner$_i$==((is_dc_a_candidate$_i$=TRUE) AND (maybe_first_sv$_i$=TRUE))

The computing systems MPC1 and MPC2 determine a selection result (420). In some implementations, the computing systems MPC1 and MPC2 can calculate the selection result based on the winner parameters for the digital components and the digital component information element dc_information_element for the digital components. As described above, the digital component information element dc_information_element for a digital component can include the selection value for the digital component and other data for the digital component.

Conceptually, the computing systems MPC1 and MPC2 can calculate the selection result parameter "result" using relationship 5 below:

result=$\Sigma_i$ is_dc_the_winner$_i$×dc_information_element$_i$

That is, the computing systems MPC1 and MPC2 can determine, across all of the digital components, the sum of the products of the winner parameter is_dc_the_winner$_i$ and the digital component information element dc_information_element$_i$. In this example, the selection result will either have a value zero if there are no candidate digital components or will have a value equal to the digital component information element dc_information_element of the selected digital component that has a winner parameter is_dc_the_winner$_i$ that is equal to one. In another example, the digital component information element dc_information_element can be replaced in relationship 5 with the selection values for the digital components. In this example, the selection result will either have a value zero if there are no candidate digital components or will have a value equal to the selection value of the selected digital component that has a winner parameter is_dc_the_winner$_i$ that is equal to one.

To perform the calculation in secret shares, computing system MPC1 takes all of the digital components and multiplies the digital component information element dc_information_element$_i$ for the digital component, which can be in cleartext, by the first secret share of the winner parameter [is_dc_the_winner$_{i,1}$] for the digital component. The computing system MPC1 can then determine the sum of these products and return the sum to the client device 110 that submitted the digital component request. That is, computing system MPC1 can determine, as a first secret share [result$_1$] of the result, the sum using relationship 6 below:

[result$_1$]=Σ$_i$([is_dc_the_winner$_i$]×dc_information_element$_i$)

The computing system MPC2 can perform a similar calculation to determine the second secret share [result$_2$] of the result using relationship 7 below:

[result$_2$]=Σ$_i$([is_dc_the_winner$_i$]×dc_information_element$_i$)

The computing system MPC1 sends the first share of the selection result [result$_1$] to the client device 110 (422). Similarly, the computing system MPC2 sends the second share of the selection result [result$_2$] to the client device 110 (424). The application 112 can then reconstruct the selection result result in cleartext using the two secret shares [result$_1$] and [result$_2$], e.g., by determining a sum of the secret shares if additive secret share algorithms are adopted. If the selection result has a value of zero, then the MPC cluster 130 did not identify a digital component for distribution to the client device 110. Otherwise, the selection result has a value equal to a digital component information element dc_information_element. The application 112 can parse the digital component information element dc_information_element to obtain the selection value and the metadata for the digital component. The application 112 can then either display the digital component or perform a selection process using the digital component and other digital components received from an SSP 170, as described above.

In some implementations, the selected digital component is sent to the client device 110 using a mask to prevent either computing system MPC1 or MPC2 from being able to access the selected digital component in cleartext and to reduce latency in sending the digital component to the client device 110. In this example, the application 112 can select a nonce for each digital component request and send the nonce with the digital component request. The application 112 can send the nonce to one of the computing systems MPC1 or MPC2. For the purpose of an example, assume that the nonce is sent to computing system MPC2.

Both the application 112 and the computing system MPC2 can independently calculate a mask of the same size as the largest digital component creative with the same algorithm and the same input. For example, the i$_{th}$ bit of the mask can be represented as PRF(nonce, i), where PRF represents a pseudorandom function. Both the application 112 and the computing system MPC2 can keep the nonce and mask strictly confidential from computing system MPC1.

To send the selected digital component to the application 112, computing system MPC2 can send [result$_2$] bitwise-XOR mask to computing system MPC1. The computing system MPC1 then sends [result$_1$] bitwise-XOR ([result$_2$] bitwise-XOR mask) to the application 112 as the selection result, e.g., as the response to the digital component request.

The application 112 can calculate [result$_1$] bitwise-XOR ([result$_2$] bitwise-XOR mask) bitwise-XOR mask as the creative for the digital component. This is equivalent to [result$_1$] bitwise-XOR [result$_2$]. This reduces the bandwidth required to the size of the largest creative, while preserving the private information retrieval guarantee. This reduces the bandwidth of the response relative to sending the two secret shares of the selection result, as described above. In this way, there is little or no additional latency or bandwidth consumption in this privacy preserving technique relative to sending a digital component creative as in other processes.

For second value selection processes, the computing systems MPC1 and MPC2 can calculate secret shares of a second selection value parameter maybe_second_sv$_i$ for each digital component. The second selection value parameter for a digital component i can be a Boolean value that represents whether the selection value for the digital component might be second highest selection value among the candidate digital components. The selection value would only be the second highest selection value among the candidate digital components if the digital component corresponding to the selection value is actually a candidate digital component. Thus, the second selection value parameter maybe_second_sv$_i$ for digital component i represents whether the digital component would have the second highest selection value if the digital component is actually a candidate digital component. The computing systems MPC1 and MPC2 can perform a secret share equality test to determine secret shares of the second selection value parameter maybe_second_sv$_i$=(acc$_i$==1).

At the end of this equality test, computing system MPC1 has a first secret share [maybe_second_sv$_{i,1}$] of the second selection value parameter maybe_second_sv$_i$ for digital component i and computing system MPC2 has a second secret share [maybe_second_sv$_{i,2}$] of the second selection value parameter maybe_second_sv$_i$ for digital component i.

The computing systems MPC1 and MPC2 can then determine the candidate digital component having the second highest selection value in terms of secret shares by determining, for each digital component i, if the result of is_dc_a_candidate$_i$ AND maybe_second_sv$_i$ is a Boolean value of true, or one. That is, the computing systems MPC1 and MPC2 can determine which digital component is a candidate digital component and has a second selection value parameter maybe_second_sv$_i$ with a Boolean value of true, or one.

Conceptually, the computing systems MPC1 and MPC2 can calculate the second highest selection value among the candidate using relationship 8 below:

second_selection_value=Σ$_i$(selectionvalue$_i$×(is_dc_a_candidate$_i$ AND maybe_second_sv$_i$))

In relationship 8, the parameter "selectionvalue$_i$" is the selection value for digital component i (with any boost) and the parameter "second_selection_value" is the value of the second highest selection value among the candidate digital components. Using relationship, the second selection value is the selection value for the digital component that is a candidate and has a second selection value parameter that has a Boolean value of true. The Boolean values in this relationship can be treated as values of one (for true) or zero (for false).

In secret shares, the computing systems MPC1 and MPC2 calculate the result of is_dc_a_candidate$_i$ AND maybe_second_sv$_i$ with secret shares, and represent the result as two additive secret shares in $Z_2$ space (e.g., add then mod 2). In addition, the selection values are in cleartext. Relationship 8 can be simplified by replacing the multiplication with a bitwise logical AND operation between each bit in the selection value in cleartext representation, and the 1-bit secret share of the result of is_dc_a_candidate$_i$ AND maybe_second_sv$_i$ held by each computing system MPC1 and MPC2. In addition, the summation can be replaced with a bitwise XOR operation.

Figure 5:
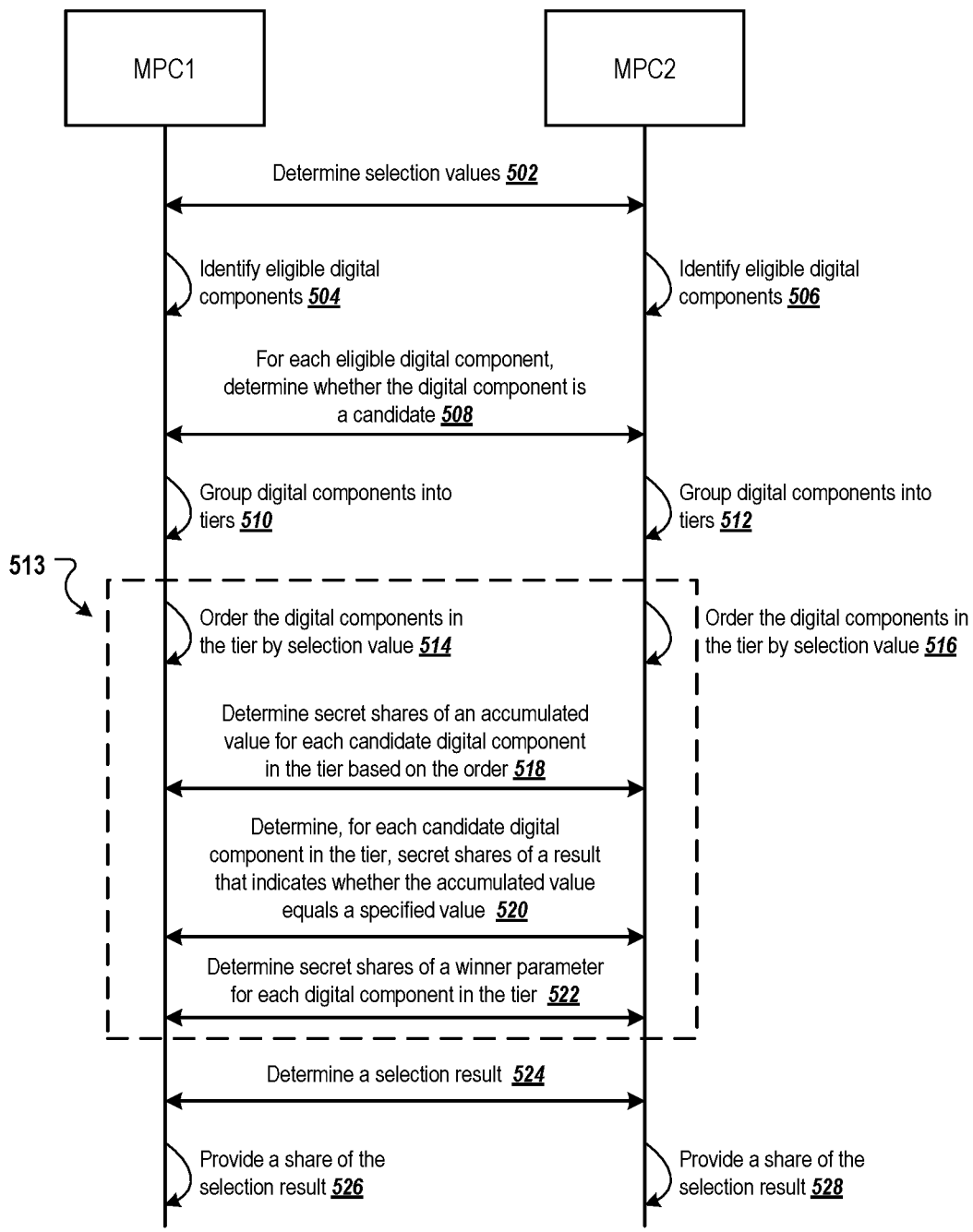
FIG. 5 is a diagram of an example process for selecting a digital component for distribution to a client device.

FIG. 5 is a swim lane diagram of an example process 500 for selecting a digital component for distribution to a client device. Operations of the process 500 can be implemented, for example, by the computing systems MPC1 and MPC2 of the MPC cluster 130. Operations of the process 500 can also be implemented as instructions stored on one or more computer readable media which may be non-transitory, and execution of the instructions by one or more data processing apparatus can cause the one or more data processing apparatus to perform the operations of the process 500. As noted above, the process 500 can be used for selection processes that include tiers.

The computing systems MPC1 and MPC2 determine selection values for digital components (502). The computing systems MPC1 and MPC2 can obtain or determine the selection values in response to receiving a digital component request from a client device 110. The computing system MPC1 identifies eligible digital components that are eligible for the digital component selection process (504). The computing system MPC2 also identifies eligible digital components that are eligible for the digital component selection process (506). For each eligible digital component, the computing systems MPC1 and MPC2 determine whether the digital component is a candidate for the digital component selection process (508). The steps 502-508 can be the same, or similar to, steps 402-408 of the process 400 illustrated in FIG. 4

The computing system MPC1 groups the digital components into tiers (510). As described above, a publisher can establish tiers for DSPs 150 and/or digital component providers 160. The tiers for a publisher can include a highest priority tier, a lowest priority tier, and optionally one or more tiers between the highest priority tier and the lowest priority tier.

The computing system MPC1 can determine the tier for each digital component based on the DSP 150 or digital component provider 160 corresponding to, e.g., that provided a selection value or vector of values for, the digital component. The computing system MPC1 can then group the digital components into their respective tiers. Similarly, the computing system MPC2 can group the digital components into their respective tiers (512). The groups of digital components for the tiers should be the same for both computing systems MPC1 and MPC2. In some implementations, the SSP 170 explicitly determines and then encodes the tier into metadata for each selection value to be stored, e.g., cached in the MPC cluster 130.

The computing systems MPC1 and MPC2 can then perform an individual selection process for each of one or more of the tiers to select a digital component to provide in response to the digital component request (513). In some implementations, the computing systems MPC1 and MPC2 perform the selection processes for the tiers in parallel. In some implementations, the computing systems MPC1 and MPC2 perform the selection processes in sequence, starting with the highest priority tier and moving down tier by tier until the selection process is performed for all tiers. In some implementations, the computing systems MPC1 and MPC2 could stop once a candidate is found in a tier, but this could risk leaking user sensitive information to the computing systems MPC1 and MPC2. The steps in the dashed box are performed for each tier for which an individual selection process is performed.

The computing system MPC1 orders the digital components that are grouped into the tier by selection values (514). Selection values can be ordered first by tier priority, then by selection value within the same tier. Similarly, the computing system MPC2 orders the digital components that are grouped into the tier by selection values (516). For each tier, these steps 514 and 516 are similar to steps 410 and 412 of the process 400 illustrated in FIG. 4. However, the orders only include the digital components included in the tier.

The computing systems MPC1 and MPC2 collaborate to determine secret shares of an accumulated value acc$_i$ for each digital component in the tier (518). As described above, the accumulated value for a given digital component can represent a total number of candidate digital components from the top of the order to the selection value for the given digital component, excluding the given digital component even if the given digital component is a candidate. The computing systems MPC1 and MPC2 can determine the accumulated value for the digital components in the tier in a similar manner as described above with reference to step 414 of the process 400 of FIG. 4.

The computing systems MPC1 and MPC2 can determine their secret shares of the accumulated value acc for each digital component independently without any roundtrip computations in some implementations depending on the secret share algorithm. For example, computing system MPC1 can determine, for each digital component i, a first share [acc$_{i,1}$] of the accumulated value acc by traversing all of the digital components in the tier in order from highest to lowest and summing the candidate parameters is_dc_a_candidate for the digital components along the way, as described above with reference to Table 3. Similarly, computing system MPC2 can determine, for each digital component i, a second share [acc$_{i,2}$] of the accumulated value acc by traversing all of the digital components in the tier in order from highest to lowest and summing the candidate parameters is_dc_a_candidate for the digital components along the way.

The computing systems MPC1 and MPC2 determine, for each candidate digital component in the tier, secret shares of a result that indicates whether the accumulated value equals a specified value (520). The specified value can be a value of zero, as shown in columns 3 and 4 of Table 3. Within a tier, the digital component for which the accumulated value is zero and the overall candidate parameter is_dc_a_candidate has a Boolean value of true or one is the digital component having the highest selection value among the candidate digital components in the tier, if any.

The computing systems MPC1 and MPC2 can engage in multiple rounds of computations, e.g., multiple RPCs, as part of a secure MPC process to calculate the equality operation acc$_i$=0 in terms of secret shares for each digital component i. The equality operation is used to determine whether the accumulated value acc$_i$ for the digital component i has a value of zero. At the end of this process, computing system MPC1 has, for each digital component i in the tier, one secret share of the result acc$_i$=0, and computing system MPC2 has, for each digital component in the tier, the other secret share of the result acc$_i$=0.

The computing systems MPC1 and MPC2 determine secret shares of a winning parameter for each digital component in the tier (522). The computing systems MPC1 and MPC2 can determine the winner parameters is_dc_the_winner$_i$ based on, for each digital component i in the tier, the secret shares of the accumulated value acc$_i$==0 and the secret shares of the candidate parameter is_dc_a_candidate$_i$ for each digital component i in the tier. The winner parameter is_dc_the_winner$_i$ for each digital component i can be a Boolean value that indicates whether the digital component i is the winner of the selection process for the tier, e.g., whether the digital component i is a candidate digital component and has the highest selection value among the candidate digital components in the tier. In some implementations, computing system MPC1 and MPC2 can carry out secret share multiplication protocol to calculate, for each selection value, the winner parameter is_dc_the_winner$_i$= (is_dc_a_candidate$_i$×(acc$_i$==0)) in terms of secret shares.

The computing systems MPC1 and MPC2 determine a selection result (524). The computing systems MPC1 and MPC2 can determine the selection result by determining the highest tier that includes a digital component having a winning parameter is_dc_the_winner$_i$ with a value (e.g., Boolean true or one) that indicates that the digital component is the winner for the tier. This digital component is the winner of the overall digital component selection process. The computing systems MPC1 and MPC2 can use the accumulated values to determine the highest tier that has a winner parameter equal to true or one. For example, the computing systems MPC1 and MPC2 can identify the highest tier for which the accumulated value for all digital components in the tier is not zero.

The computing system MPC1 provides a first secret share of the selection result to the client device 110 from which the digital component request was received (526). The computing system MPC2 provides a second secret share of the selection result to the client device 110 from which the digital component request was received (528).

In a second value selection process that includes tiers, a selection value for a digital component is only eligible to provide the second selection value for the selection process if the digital component is in the same tier as the selected digital component. To determine the second selection value, the computing systems MPC1 and MPC2 can calculate, for each tier t, a winning tier parameter maybe_winning_tier$_t$ that represents whether the tier t includes the digital component selected for distribution to the client device 110. Conceptually, the computing systems MPC1 and MPC2 can calculate the winning tier parameter maybe_winning_tier$_t$ for each tier t using relationship 9 below:

$$\text{maybe\_winning\_tier}_t = \left(\sum_{i \in T} \text{is\_dc\_a\_candidate}_i\right) == 0$$

In relationship 9, the parameter "T" represents all tiers with a higher priority than tier t. Thus, the winning tier parameter maybe_winning_tier$_t$ for a tier represents whether any higher priority tier includes a candidate digital component. If not, the tier t is the winning tier if it includes at least one candidate digital component.

The equality test between the sum and the value zero can also be calculated using an RPC between the computing systems MPC1 and MPC2. Multiple RPCs for various computations may be grouped together to a smaller number of RPCs to reduce latency and network bandwidth consumption between the computing systems MPC1 and MPC2.

The computing systems MPC1 and MPC2 can then determine whether the second selection value is set by the selection value for a given digital component based on a combination of the candidate parameter is_dc_a_candidate$_i$ for the given digital component, the second selection value parameter maybe_second_sv$_i$ for the digital component (which can be calculated as described above with reference to FIG. 4), and the winning tier parameter maybe_winning_tier$_t$ for the tier t that includes the given digital component. For example, the second selection value is set by the selection value of the given digital component when is_dc_a_candidate$_i$ AND maybe_second_sv$_i$ AND maybe_winning_tier$_t$ for the given digital component has a Boolean value of true, or one.

The computing systems MPC1 and MPC2 can then determine the second selection value using the selection value for the given digital component. For example, the second selection value can be equal to the selection value for the given digital component or the selection value for the given digital component plus a specified amount.

DSPs 150 and digital component providers 160 can often benefit from knowing the highest other selection value of a digital component process so that they can optimize or improve the selection values that they provide for digital components in similar selection processes. For example, a DSP 150 whose digital component selected may benefit from knowing how much higher its selection value was than the next highest. Similarly, a DSP 150 whose digital component was not selected may benefit from knowing how much higher the selection value would need to be in order for the digital component to be selected. When the DSPs 150 and/or digital component providers 160 provide selection values based on this information, the DSP 150 is more likely to achieve its objective, e.g., avoid waste due to overly high selection values, or avoid losing digital component presentation opportunities due to low selection values.

For the DSP 150 or digital component provider 160 whose digital component was selected, the highest other selection value is the second highest selection value. For all others, the highest other selection value is the highest selection value. This is the same for both first value selection processes and second value selection processes.

Figure 6:
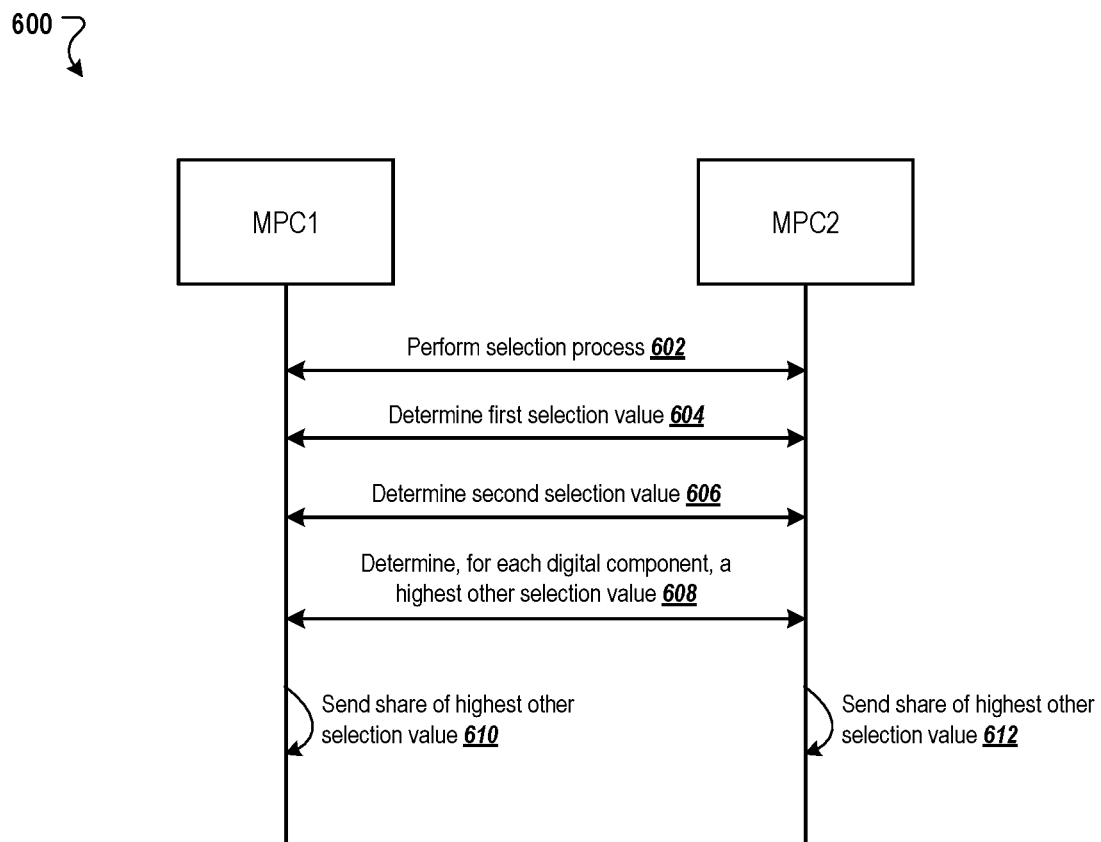
FIG. 6 is a diagram of an example process for determining a highest other selection value for digital components in a digital component selection process.

FIG. 6 is a diagram of an example process 600 for determining a highest other selection value for digital components in a digital component selection process. Operations of the process 600 can be implemented, for example, by the computing systems MPC1 and MPC2 of the MPC cluster 130. Operations of the process 600 can also be implemented as instructions stored on one or more computer readable media which may be non-transitory, and execution of the instructions by one or more data processing apparatus can cause the one or more data processing apparatus to perform the operations of the process 600.

The computing systems MPC1 and MPC2 perform a digital component selection process to select a digital component for distribution to a client device (602). The computing systems MPC1 and MPC2 can collaborate using a secure MPC process to select the digital component, as described above with reference to FIGS. 3-5.

The computing systems MPC1 and MPC2 determine a first selection value for the digital component selection process (604). The first selection value can be the selection value of the digital component selected for distribution to the client device 110. For example, the first selection value can be the highest selection value of the candidate digital components. If tiers are used, the first selection value can be the highest selection value of the candidate digital component in the highest priority tier that includes at least one candidate digital component.

The computing systems MPC1 and MPC2 can collaborate to determine the first selection value using a secure MPC process. Conceptually, the computing systems MPC1 and MPC2 can determine the first selection value using relationship 10 below:

first selection value =
$$\sum (\text{selection\_value}_i \times (\text{is\_dc\_a\_candidate}_i \text{ AND maybe\_first\_sv}_i))$$

This sum can be across all of the digital components included in the digital component selection process. The selection value (selection_value) for each digital component i can be in cleartext. As described above, the computing systems MPC1 and MPC2 can calculate secret shares of the candidate parameter is_dc_a_candidate$_i$ and the first selection value parameter maybe_first_sv$_i$. The computing system MPC1 can store, for each digital component i, a first share [is_dc_a_candidate$_{i,1}$] of the candidate parameter is_dc_a_candidate$_i$ and a first share [maybe_first_sv$_{i,1}$] of the first selection value parameter maybe_first_sv$_i$. Similarly, computing system MPC2 can store, for each digital component i, a second share [is_dc_a_candidate$_{i,2}$] of the candidate parameter is_dc_a_candidate$_i$ and a second share [maybe_first_sv$_{i,2}$] of the first selection value parameter maybe_first_sv$_i$.

The computing systems MPC1 and MPC2 determine a second selection value for the digital component selection process (606). The second selection value can be the next highest selection value behind the selection value of the digital component selected for distribution to the client device 110. For example, the second selection value can be the second highest selection value of the candidate digital components. If tiers are used, the second selection value can be the second highest selection value of the candidate digital component in the highest priority tier that includes at least one candidate digital component.

The computing systems MPC1 and MPC2 can collaborate to determine the second selection value using a secure MPC process. Conceptually, the computing systems MPC1 and MPC2 can determine the second selection value using relationship 11 below:

second selection value =
$$\sum (\text{selection\_value}_i \times (\text{is\_dc\_a\_candidate}_i \text{ AND maybe\_second\_sv}_i))$$

This sum can be across all of the digital components included in the digital component selection process. As described above, the computing systems MPC1 and MPC2 can calculate secret shares of the candidate parameter is_dc_a_candidate$_i$ and the second selection value parameter maybe_second_sv$_i$. The computing system MPC1 can store, for each digital component i, a first share [maybe_second_sv$_{i,1}$] of the second selection value parameter maybe_second_sv$_i$. Similarly, computing system MPC2 can store, for each digital component i, a second share [maybe_second_sv$_{i,2}$] of the second selection value parameter maybe_second_sv$_i$.

In relationships 10 and 11, the Boolean values true and false can be treated as one and zero, respectively. In secret shares, the computing systems MPC1 and MPC2 calculate the result of the AND operation of both relationships 10 and 11 with secret shares (e.g., using an RPC between the computing systems) and represent the result as two additive secret shares in $Z_2$ space (e.g., add then mod 2). Thus, each computing system can store a secret share of the first selection value and the second selection value. For example, computing system MPC1 can store a first share of the first selection value and a first share of the second selection value. Similarly, computing system MPC2 can store a second share of the first selection value and a second share of the second selection value. The sum (e.g., add then mod 2) of the two shares of the first selection value equals the first selection value and the sum (e.g., add then mod 2) of the two shares of the second selection value equals the second selection value.

Relationships 10 and 11 can be simplified by replacing the multiplication with a bitwise AND operation between each selection value in the selection values (selection value) and the 1-bit secret share of the result of the AND operation between the candidate parameter and the first selection value parameter (or the second selection value parameter) held by each computing system MPC1 and MPC2. In addition, the summations of relationships 10 and 11 can be replaced with a bitwise XOR operation.

For each digital component, the computing systems MPC1 and MPC2 calculate the highest other selection value (608). The computing systems MPC1 and MPC2 can calculate the highest other selection value for a digital component using a two step process in secret shares. The computing systems MPC1 and MPC2 can calculate the winner parameter is_dc_the_winner$_i$ for the digital component i. The computing systems MPC1 and MPC2 can calculate the winner parameter is_dc_the_winner$_i$ using the secret shares of the candidate parameter is_dc_a_candidate$_i$ and the secret shares of the first selection value parameter maybe_first_sv$_i$, e.g., is_dc_the_winner$_i$=is_dc_a_candidate$_i$ AND maybe_rst_sv$_i$.

The computing systems MPC1 and MPC2 can then calculate the highest other selection value (HOSV$_i$) for the digital component i using relationship 12:

$$\text{HOSV}_i = (\text{is\_dc\_the\_winner}_i \times \text{second selection value}) + ((1 - \text{is\_dc\_the\_winner}_i) \times \text{first selection value})$$

Because the winner parameter, first selection value, and second selection value are held by the computing systems MPC1 and MPC2 in secret shares, the computing systems MPC1 and MPC2 determines the highest other selection value in collaboration using a RPC between the two computing systems MPC1 and MPC2.

At the end of this process, the computing system MPC1 stores a first share [HOSV$_{i,1}$] of the highest other selection value for the digital component i and the computing system MPC2 stores a second share [HOSV$_{i,2}$] of the highest other selection value for the digital component i.

The computing system MPC1 sends the first share of the highest other selection value for each digital component, e.g., to the DSP 150 or digital component 160 corresponding to the digital component (610). Similarly, the computing system MPC2 sends the second share of the highest other selection value for each digital component, e.g., to the DSP 150 or digital component 160 corresponding to the digital component (612). In some implementations, the computing systems MPC1 and MPC2 provide the shares to an aggregation service that aggregates the information for each DSP 150 and/or each digital component provider 160.

The recipient of the two secret shares can combine the shares to derive the highest other selection value for the digital component in the digital component selection process. For example, if an additive secret sharing algorithm is used, the recipient can derive the highest other selection value by adding the two shares.

The computing systems MPC1 and MPC2 can send additional data with the highest other selection value. For example, the computing systems MPC1 and MPC2 can send the contextual signals of the digital component selection process, e.g., the lookup key, with its share of the highest other selection value. In this way, the landscape of selection values for digital component selection processes having the same or similar context can be calculated using the highest other selection values for digital component selection processes having the same or similar context.

In some implementations, to increase performance, the computing systems MPC1 and MPC2 can calculate the highest other selection values asynchronously after the selection result of the digital component selection process is provided to the client device 110. This reduces the latency in transmitting and displaying the digital component. In some implementations, the computing systems MPC1 and MPC2 can calculate the highest other selection values when the load on the computing systems MPC1 and MPC2 are lower than a baseline load.

For selection processes that include floors for selection values, extra steps can be taken to accurately calculate the highest other selection value. The computing systems MPC1 and MPC2 can calculate the highest other selection values as described with reference to FIG. 6. The computing systems MPC1 and MPC2 can then adjust the highest other selection values to account for the floors, e.g., so that no selection value is smaller than the applicable floor.

Let H denote the calculated highest other selection value and F denote the applicable floor. The final highest other selection value would be (H>F)×H+(1−H>F, which is equivalent to F+(H>F)×(H−F).

To protect user privacy, H is in the form of secret shares. Each computing system MPC1 and MPC2 hold one of the secret shares [$H_1$] and [$H_2$] respectively. The computing system MPC1 can calculate a first share of the final highest other selection value in secret shares using relationship 13:

$[HOSV_1]=F+([H_1]>F)\times([H_1]-F)$

Similarly, computing system MPC2 can calculate a second share of the final highest other selection value in secret shares using relationship 14:

$[HOSV_2]=F+([H_2]>F)\times([H_2]-F)$

This process of calculating the highest other selection value for digital component processes that include floors can employ three or more rounds of RPCs for comparison tests and one round for multiplication.

When tiers and/or boosts are used in a digital component selection process, the first selection value, e.g., the selection value for the selected digital component, may be lower than the highest selection value among the candidate digital components. For example, if a candidate digital component in the highest priority tier has a lower selection value than a candidate digital component in a lower priority tier, the candidate digital component in the higher priority tier may be selected although it has a lower selection value. Similarly, a digital component may receive a boost that makes the selection value used in the digital component selection value higher than a non-boosted (or lower boosted) digital component such that the publisher receives less than it would have if the non-boosted digital component was selected. The MPC cluster 130 can determine a difference between the two values so that publishers can analyze the opportunity cost associated with tiers and/or boosts.

Figure 7:
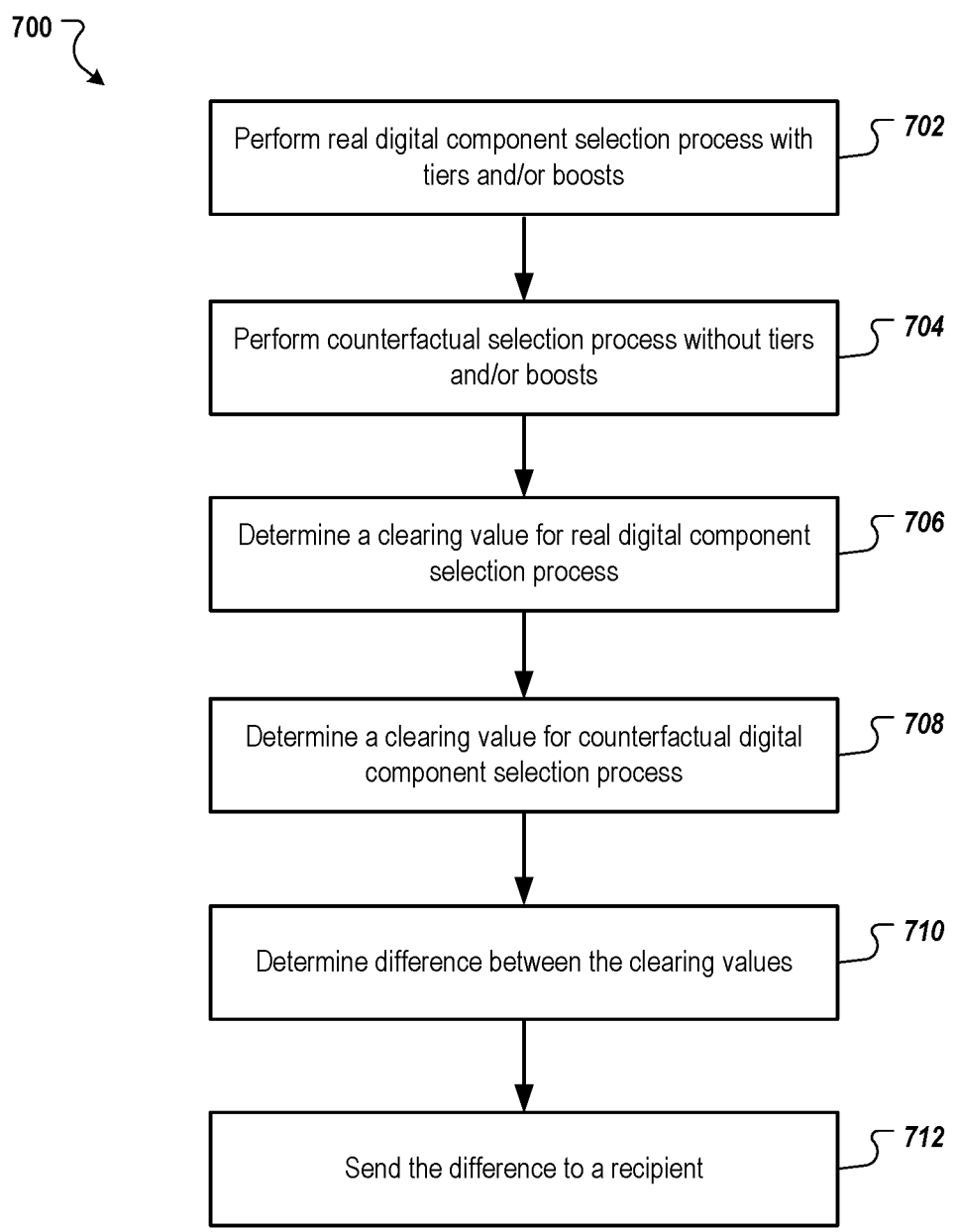
FIG. 7 is a flow diagram of an example process for determining a difference between a first selection value of a real digital component selection process and a counterfactual digital component selection process.

FIG. 7 is a flow diagram of an example process 700 for determining a difference between a first selection value of a real digital component selection process and a counterfactual digital component selection process. Operations of the process 700 can be implemented, for example, by the computing systems MPC1 and MPC2 of the MPC cluster 130. Operations of the process 700 can also be implemented as instructions stored on one or more computer readable media which may be non-transitory, and execution of the instructions by one or more data processing apparatus can cause the one or more data processing apparatus to perform the operations of the process 700.

The computing systems MPC1 and MPC2 perform a real digital component selection process (702). The computing systems MP1 and MPC2 can perform a real digital component selection process to select a digital component to provide to a client device 110 in response to a digital component request. The real digital component selection process can include tiers for the digital components and/or boosts for one or more of the digital components included in the digital component selection process. For example, the real digital component process should be the same as or similar to the processes of FIGS. 3-5.

The computing systems MPC1 and MPC2 perform a counterfactual digital component selection process (704). The steps of the counterfactual digital component process can be similar to the steps of the real digital component selection process. However, in the counterfactual digital component selection process, the tiers and/or boosts of the real digital component selection process are removed. If the real digital component selection process includes tiers (e.g., as in the process 400 of FIG. 4), the counterfactual digital component selection process has all of the digital components in one group (e.g., as in the process 500 of FIG. 5). If the real digital component selection process included boosting the selection value for one or more digital components, those boosts are removed in the counterfactual digital component selection process. That is, the selection values in the counterfactual digital component selection process can be the received selection values rather than the boosted selection values.

The computing systems MPC1 and MPC2 determine a clearing value for the real digital component selection process (706). This clearing value can be based on the selection value for the selected digital component. For example, the clearing value can be the amount of the selection value that will actually be provided to the publisher for displaying the selected digital component. If the selection value for the digital component was boosted, the boost amount would only impact the order of the selection values when determining the accumulated value for each candidate digital component in operation 414.

For second value selection processes, the clearing value would be based on the next highest selection value after the selection value for the selected digital component. If tiers are used with a second selection value process, the next highest value would be the next highest value in the same tier as the selected digital component. If there is no such candidate digital component in the same tier, the next highest value can be a minimum value for the digital component selection process.

The computing systems MPC1 and MPC2 determine a clearing value for the counterfactual digital component selection process (708). This clearing value can be based on the digital component selected in the counterfactual digital component selection process. For second value selection processes, the clearing value would be based on the next highest selection value after the selection value for the selected digital component, similar to the clearing value for the real digital component selection process.

The computing systems MPC1 and MPC2 determine a difference between the two clearing values (710). The computing systems MPC1 and MPCs can determine the difference by subtracting the clearing value for the counterfactual digital component selection process from the clearing value for the real digital component selection value.

The computing systems MPC1 and MPC2 provide the difference to a recipient (712). For example, one of the computing systems can provide the difference to the publisher of the resource or application content with which the digital component was displayed after selection. In another example, one of the computing systems can provide the difference to an aggregation server that aggregates the differences for the publisher. In either example, the computing system can provide, with data indicating the difference, the contextual signals, e.g., the lookup key, for the real digital component selection process and data identifying the publisher (if sent to an aggregation server).

The aggregation server can aggregate the differences reported for each publisher and provide data, e.g., in the form of an interactive user interface, indicating the opportunity cost of the use of tiers and/or boosts. In some implementations, the computing system MPC1 or MPC2 can also provide the selection result to the aggregation server for each real digital component selection process. In this way, the aggregation server can aggregate the opportunity cost for each DSP 150 and/or digital component provider 160.

To reduce latency in providing the selected digital component of the real digital component selection process to the client device 110, some or all of steps 704-712 of the process 700 can be performed asynchronously, e.g., after the selection result is provided to the client device 110.

Figure 8:
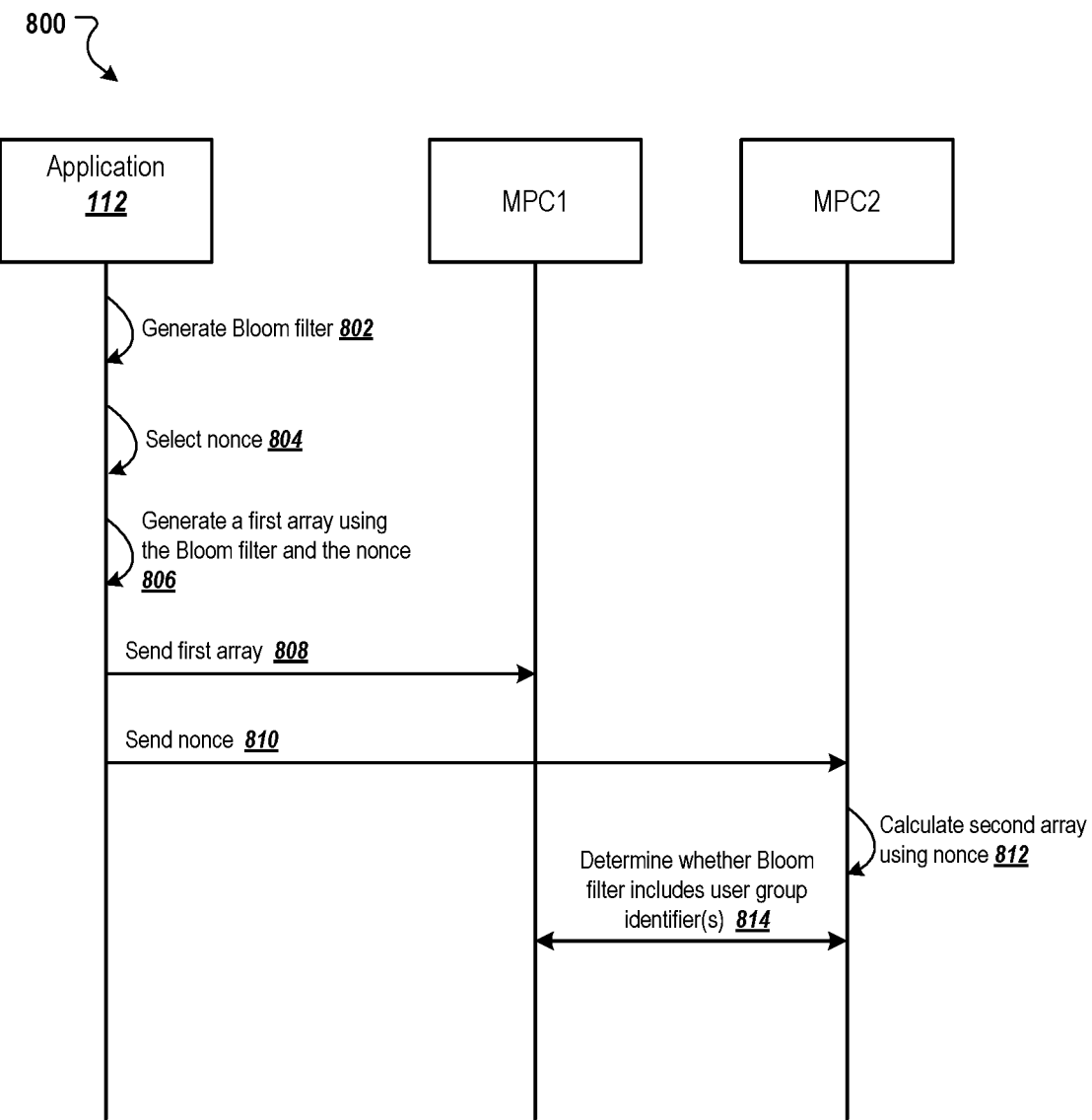
FIG. 8 is a flow diagram of an example process for determining whether a user is a member of a user group using a Bloom filter sent using secret shares.

FIG. 8 is a flow diagram of an example process 800 for determining whether a user is a member of a user group using a Bloom filter sent using secret shares. Operations of the process 800 can be implemented, for example, by an application 112 running on a client device 110 and computing systems MPC1 and MPC2 of the MPC cluster 130 of FIG. 1. Operations of the process 800 can also be implemented as instructions stored on one or more computer readable media which may be non-transitory, and execution of the instructions by one or more data processing apparatus can cause the one or more data processing apparatus to perform the operations of the process 800.

Sending data representing a user's group membership using a Bloom filter can reduce the amount of data being sent and preserve user privacy as the data identifying the user groups for the user is not being sent in cleartext. To prevent the computing systems MPC1 and MPC2 from being able to access a user's group membership in cleartext, the application 112 can send respective shares, e.g., secret shares of the Bloom filter to each computing system 112 rather than the full Bloom filter to each computing system MPC1 and MPC2. However, this can require sending data equivalent to sending two Bloom filters, one to each computing system MPC1 and MPC2. To prevent this and further reduce the amount of data sent from the client device 110 across the network 105 to the computing systems MPC1 and MPC2, the application 112 can send a first array generated using a nonce and the original bloom filter created by the application 112 to one of the computing systems, e.g., computing system MPC1, and just the nonce to the other computing system MPC2. In this way only one array is sent from the client device 110. As the nonce can be small, e.g., 16 bytes, this greatly reduces the amount of data sent from the client device 110, which reduces bandwidth consumption, latency, and battery consumption of the client device 110.

Although the process 800 is described in terms of a Bloom filter representing a user's membership in user groups, a similar process can be used to generate a Bloom filter for representing blocked digital components and to query whether a digital component is blocked. In that example, the Bloom filter would represent identifiers of blocked digital components rather than identifiers for user groups.

The configuration of the Bloom filter can be adapted for transmission and/or processing by the computing systems MPC1 and MPC2. The parameters of the Bloom filter include the number of user groups that can be represented by a Bloom filter, the desired false positive rate of the Bloom filter, the number of hash functions used to generate the Bloom filter and test whether an element is included in the Bloom filter, and the size of the Bloom filter.

By reducing the number of hash functions, the computational burden on the computing systems MPC1 and MPC2 is reduced when querying whether a user is a member of a user group. However, this can increase the false positive rate if the size of the Bloom filter remains constant. If there is a target false positive rate, reducing the hash functions may result in a larger Bloom filter size, which can increase the amount of consumed bandwidth. Thus, the parameters of the Bloom filter can be selected using a tradeoff between bandwidth/battery consumption and computational burden on the computing systems MPC1 and MPC2.

The application 112 generates a Bloom filter (802). The application 112 can generate the Bloom filter using the user group identifiers for the user groups that include the user of the application 112 as a member. To do so, the application 112 uses each hash function for the Bloom filter to map a user group identifier to one of the positions in the Bloom filter. The application 112 can perform this operation for each user group identifier for the user. When constructing a Bloom filter for blocked digital components, the application 112 can apply each hash function for the Bloom filter for blocked digital components to the identifier for each blocked digital component. The Bloom filter is a bit array A of size N. Each bit of the Bloom filter is either a zero or a one, i.e., $A[i] \in \{0,1\}$.

The application 112 and the computing systems MPC1 and MPC2 can agree on a pseudorandom function (PRF) in advance. The PRF can take two parameters and generate a PRF number in $\{0, 1\}$ inclusively.

The application 112 selects a nonce (804). For each digital component request, the application 112 can select, e.g., randomly or pseudorandomly, a nonce to be shared with only one of the computing systems MPC1 or MPC2. In this example, the nonce is shared with computing system MPC2.

The application 112 calculates a first array $A_1$ using the Bloom filter and the nonce (806). The application 112 can calculate the first array $A_1$ using the agreed upon PRF. For example, the application 112 can calculate the first array A1 using relationship 15:

$$A_1[i] = A[i] \text{ XOR PRF}(nonce, i)$$

In relationship 15, the XOR operation is a bitwise XOR operation.

The application 112 sends the first array to computing system MPC1 (808). The application 112 also sends the nonce to computing system MPC2 (810).

The computing system MPC2 calculates a second array $A_2$ using the nonce (812). The computing system MPC2 can calculate the second array A2 using the nonce and the PRF. For example, computing system MPC2 can calculate the second array A2 using relationship 16:

$$A_2[i]=\text{PRF}(\text{nonce},i)$$

The computing systems MPC1 and MPC2 use the first array $A_1$ and the second array $A_2$ to determine whether the user is a member of one or more user groups (814). In general, a Bloom filter can be queried by applying each hash function of the Bloom filter to a user group identifier to determine an element of the Bloom filter corresponding to the hash function and the user group identifier. If, for the user identifier, the element for each hash function has a value of one, this would represent that the user is a member of the group. Of course, there can be some false positives due to the nature of Bloom filters.

As neither computing system MPC1 nor MPC2 has access to the complete Bloom filter (instead each only has a secret share of the Bloom filter), the computing systems MPC1 and MPC2 can use a cryptographic protocol to determine whether the user is a member of a user group identifier by a user group identifier. Some example cryptographic protocols that can be used include a garbled circuit and the Goldreich-Micali-Wigderson (GMW) protocol.

In either algorithm, the input to the algorithm (conceptually) are the secret shares of the Bloom filter, i.e., the first array $A_1$ and the second array $A_2$. The outputs are secret shares for a set of Boolean messages, one for each digital component, i.e. whether the user is a member of the user group associated with the corresponding digital component.

In GMW protocol, one of the MPC computing systems, e.g., computing system MPC1, creates a truth table, one row per possible bit pattern for the secret shares owned by computing system MPC2. The computing system MPC1 selects, e.g., randomly, its own secret share for the results, and calculates computing system MPC2's secret share for each row, based on its own secret shares for the result, and the possibly computing system MPC2's secret shares corresponding to the row. After the truth table is constructed, computing system MPC2 fetches one and only one row from the table, based on its own secret shares, using an oblivious transfer protocol. In this protocol, one computing system transfers one of multiple pieces of information to the other computing system but does not know which piece (if any) has been transferred. This oblivious transfer protocol guarantees that the process does not leak any information to any party.

The result of querying the Bloom filter for a given user group identifier is secret shares of a user group membership condition parameter for each hash function. The secret shares of the user group membership condition parameter can be used in the digital component selection process to determine whether a digital component corresponding to the user group is a candidate for the digital component selection process. For example, if 10 hash functions are used, computing system MPC1 would have 10 first secret shares of a user group membership condition parameter for each user group identifier. Similarly, computing system MPC2 would have 10 second secret shares of a user group membership condition parameter for each user group identifier.

If the Bloom filter represents identifiers for blocked digital components, the computing systems MPC1 and MPC2 can reconstruct the second array and query the Bloom filter in a similar manner. The result of querying this Bloom filter for a given digital component is a blocked condition parameter for each hash function. The secret shares of the blocked condition parameter can be used in the digital component selection process to determine whether the digital component is a candidate for the digital component selection process.

FIG. 9 is a block diagram of an example MPC computing system 900. Any of the MPC computing systems described in this document can be implemented using the MPC computing system 900. Alternatively, an MPC computing system can be implemented as one or more servers. However, the architecture and configuration of MPC computing system 900 provides many performance improvements relative to using a generic server arrangement.

The MPC computing system 900 includes a load balancer 910, a serving pool 920, and a log processor pool 940. The computing system 900 also generates, updates, and otherwise maintains logs 930 and snapshots 950.

In some implementations, the MPC computing systems 900 are deployed in various geographic regions to reduce the latency in selecting digital components and providing digital components to client devices 110. For example, an MPC cluster having two or more MPC computing systems 900 can be deployed in each region of a set of regions. If each MPC cluster includes two MPC computing systems, e.g., MPC1 and MPC2, each region can include a pair of MPC computing systems 900 operated by different parties. Each instance of MPC1 across all of the regions can be operated by a first party and each instance of MPC2 across all regions can be operated by a second party different from the first party.

The MPC cluster in a region can perform the digital component selection process for digital component requests generated by client devices 110 in the region. For example, the instructions for a digital component slot, e.g., tag, that is sent to a client device 110 in a particular region can include a reference to the network location of the MPC computing systems 900 in the particular region. In this way, the application 112 sends the digital component request and notifications to the MPC computing systems 900 in the appropriate region. In another example, a Domain Name Service (DNS) or the load balancer 910 selects the MPC computing system 900 that is closest in physical distance to the client device 110.

The MPC1 in a region can collaborate with the MPC2 in the same region to select digital components and update logs based on received requests. This reduces the latency and consumed bandwidth in performing collaborative computations that require roundtrips between the MPC computing systems 900 as the distance between the MPC computing systems 900 is reduced. This also reduces the latency and consumed bandwidth in data transmissions, e.g., digital component requests, digital component responses, and impression notifications, between client devices 110 and MPC computing systems 900.

In some implementations, the log processor pool 940 is only enabled in a proper subset of the regions for creating and publishing snapshots to the MPC computing systems 900 in the other regions. For example, there can be a first MPC computing system MPC1 in each region that is operated by a first party. A subset of these first MPC computing systems can create the snapshots for all of the first MPC computing systems and publish the snapshots to the other first MPC computing systems. Similarly, there can be a second MPC computing system MPC2 in each region that is operated by a second party. A subset of these second MPC computing systems can create the snapshots for all of the second MPC computing systems and publish the snapshots to the other second MPC computing systems. Importantly, the first MPC computing systems do not share logs or snapshots with second MPC computing systems and vice versa to preserve user privacy. However, the first computing systems and the second computing systems do perform secure MPC processes to process the data in the logs as at least some of the data is sensitive and/or confidential and should not be accessible by either computing system in cleartext. To do so efficiently and without increased latency or bandwidth consumption, the subset of the first MPC computing systems and the subset of the second MPC computing systems can be in the same region.

The load balancer 910 receives requests from applications 112 running on client devices 110. These requests, which can be in the form of HTTP requests in some examples, can include digital component requests and notifications. The notifications can include impression notifications that notify the MPC computing system 900 that a digital component was displayed at a client device 110 and optionally whether a user interacted with the digital component. An impression notification can also include additional information, such as a selection process identifier that identifies the digital component selection process in which the displayed digital component was displayed. For k-anonymity conditions, an impression notification can also include data identifying the winner of the actual digital component process and the winner of the counterfactual selection process so that the MPC computing system 900 can update the impression count for each digital component.

The load balancer 910 can assign requests to processors of the serving pool 920 in a way that balances the loads between the processors in the serving pool 920. For example, the load balancer 910 can alternate between the processors in order or monitor the load of each processor and assign the requests based on current load.

The serving pool 920 includes multiple processors, each of which can be implemented as, for example, one or more microprocessors, one or more server-class computers, and/or one or more application-specific integrated circuits (ASICs). The processors of the serving pool process the incoming requests, which are typically latency sensitive. For example, a processor of the serving pool 920 can perform the digital component selection process in collaboration with a processor of another MPC computing system 900. A processor of the serving pool 920 can also update the logs 930 based on completed digital component processes and/or received notifications.

The processors of the serving pool 920 can maintain a current database for the stored digital components. This database can include the current values for the parameters and/or conditions for the digital component. For example, the database can include, for each stored digital component, the selection value(s) or vectors, the secret shares of the parameter for at least some of the conditions, e.g., for conditions that can be computed offline such as k-anonymity and pacing, remaining budget, the number of impressions (e.g., for the k-anonymity condition), and/or other data for the digital components that is used in the digital component selection processes described in this document.

In some implementations, the database of the serving pool is the snapshots. For example, each snapshot can have a version identifier that identifies the version of the snapshot. Both MPC systems should be operating using the same versions of snapshots.

The logs 930 can include multiple types of logs that store various information related to the digital components stored by an MPC cluster. For example, the logs 930 can include a log for storing digital components and their corresponding data, e.g., selection values, selection value vectors, lookup keys, corresponding user group identifier(s), conditions, and/or other appropriate information.

The logs 930 can include logs of information for completed digital component requests. Such a log can include the selection process identifier for each digital component selection process, the clearing value for the digital component selection process, and the parameters for each digital component that was included in the digital component selection process. These parameters can include, for example, secret shares of the candidate parameter, the winning parameter, the selection value, and/or the accumulated value for the digital component.

The logs 930 can include logs for parameters used to determine whether conditions for the digital components are satisfied. For example, such a log can include, for each digital component, the number of impressions, the number of selections, the number of conversions, the total budget, the remaining budget, and/or the number of times the digital component could have been presented (e.g., the number of times it was selected in the counterfactual selection process for k-anonymity). To protect user privacy and the confidentiality of sensitive user data, in some implementations, the logs 930 contain secret shares of above information.

The log processor pool 940 can include processors (e.g., microprocessors, servers, or ASICs) that process the logs 930 and generate snapshots 950 based on the logs. Each snapshot includes an update for the database maintained by the processors of the serving pool 920. For example, if a digital component was selected and displayed at a client device 110, a snapshot can include an updated remaining budget for the digital component and an updated number of impressions for the digital component. The log processor pool 940 can generate the snapshots based on updated data in the logs 930 and publish the snapshots to the processors of the serving pool 920. The processors of the log processor pool 900 can also publish the snapshots to other MPC computing systems operated by the same party, e.g., if the log processor pool 940 is only enabled at some MPC computing systems 900.

To reduce latency in responding to requests, the processors of the serving pool 920 can process these requests immediately after receiving the requests. Processes that are not as time sensitive can be handled by the processors of the log processor pool 940. For example, the serving pool 920 can perform any processes on the critical path of selecting and providing a digital component to a client device 110. The log processor pool 940 can perform any processes that are not on the critical path. However, updates to the databases should occur quickly to ensure that digital components are being selected using up to date information. Thus, using a different set of processors as provided by the architecture shown in FIG. 9 enables both the digital component selection process and the updates to the databases to be performed very rapidly.

Figure 10:
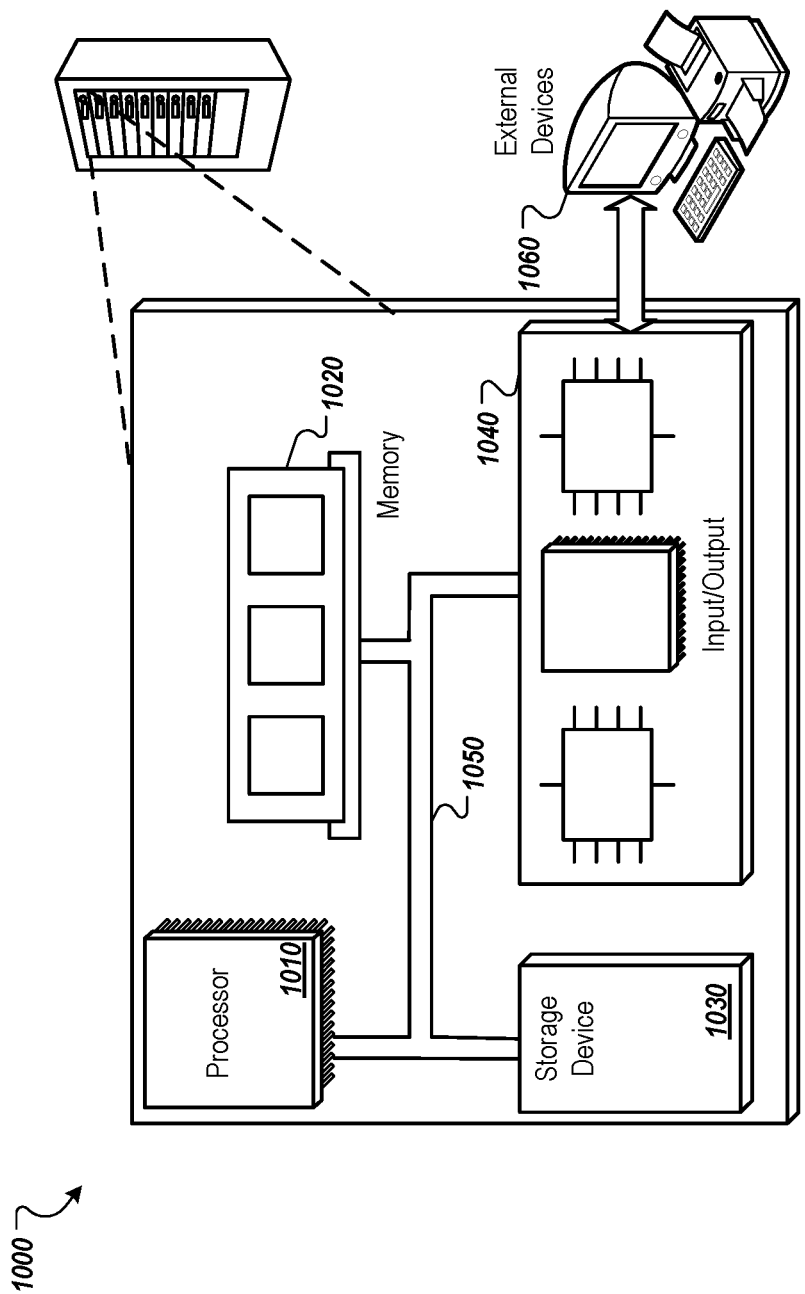
FIG. 10 is a block diagram of an example computer system.

FIG. 10 is a block diagram of an example computer system 1000 that can be used to perform operations described above. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In some implementations, the memory 1020 is a volatile memory unit. In another implementation, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a storage device that is shared over a network by multiple computing devices (e.g., a cloud storage device), or some other large capacity storage device.

The input/output device 1040 provides input/output operations for the system 1000. In some implementations, the input/output device 1040 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1060, e.g., keyboard, printer and display devices. Other implementations, however, can also be used, such as mobile computing devices, mobile communication devices, set-top box television client devices, etc.

Although an example processing system has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:

receiving, by a first server of a secure multi-party computation (MPC) system and from a client device, a digital component request;

identifying, for each digital component in a set of digital components, a selection value for the digital component and a priority tier for the digital component;

identifying a selection value floor established by a publisher of an electronic resource for which the digital component request was received;

filtering, from the set of digital components, one or more digital components having a selection value that is less than the selection value floor;

for each of a plurality of priority tiers:
  determining, using a secure MPC process in collaboration with one or more second servers of the secure MPC system, a first secret share of a winner parameter for each digital component in the priority tier, comprising:
    determining, for each digital component in the priority tier, a first secret share of a candidate parameter that indicates whether the digital component is a candidate for selection; and
    determining the first secret share of the winner parameter for each digital component in the priority tier based on (i) the first secret share of a value of the candidate parameter for each digital component in the priority tier, (ii) one or more second secret shares of the candidate parameter for each digital component in the priority tier, and the selection value for each digital component in the priority tier;

identifying a highest priority tier of the plurality of priority tiers for which a given digital component of the set of digital components has a winner parameter that indicates that the given digital component is a winning digital component for the tier; and generating a first secret share of a selection result identifying the given digital component; and providing the first secret share of the selection result to the client device.

2. The computer-implemented method of claim 1, wherein determining, using the secure MPC process in collaboration with one or more second servers of the secure MPC system, the first secret share of the winner parameter for each digital component in the priority tier comprises determining the first secret share of the winner parameter for each digital component in each priority tier in parallel.

3. The computer-implemented method of claim 1, wherein determining, using the secure MPC process in collaboration with one or more second servers of the secure MPC system, the first secret share of the winner parameter for each digital component in the priority tier comprises determining the first secret share of the winner parameter for each digital component in each priority tier in a sequence from a highest priority tier to a lowest priority tier.

4. The computer-implemented method of claim 1, wherein determining, for each digital component in the priority tier, a first secret share of a candidate parameter that indicates whether the digital component is a candidate for selection comprises determining, in collaboration with each of the one or more second servers, the first secret share of the candidate parameter for a particular digital component based on secret shares for one or more conditions for the particular digital component.

5. The computer-implemented method of claim 1, wherein identifying, for each digital component in the set of digital components, the selection value for the digital component comprises:
    identifying, for a given content platform, a boost established by a publisher of an electronic resource for which the digital component request was received or a content platform for the publisher; and
    adjusting the selection value for each digital component of the content platform using the boost.

6. The computer-implemented method of claim 1, wherein determining a secret share of the winner parameter for each digital component in the priority tier comprises:
    ordering the digital components in the priority tier based on the selection value for each digital component in the priority tier;
    determining, a first secret share of an accumulated value for each digital component in the tier based at least on the order and the first secret share of the candidate parameter for each digital component in the priority tier, wherein the accumulated value for a digital component indicates a quantity of candidate digital components in the priority tier having a higher selection value than the digital component; and
    for each digital component in the priority tier, determining the first secret share of the winner parameter for the digital component based on the first secret share of the candidate parameter for the digital component, each of the one or more second secret shares of the candidate parameter for the digital component, and the accumulated value for the digital component.

7. The computer-implemented method of claim 6, further comprising determining a second selection value corresponding to a second value selection process, comprising:
    determining, for each priority tier, a first secret share of a winning tier parameter that represents whether the given digital component is included in the priority tier;
    determining, for each digital component in the set of digital components, a first secret share of a second selection value parameter that represents whether the selection value for the digital component might be second highest selection value among a set of candidate digital components; and
    identifying, as the second selection value, a selection value for a digital component for which (i) the candidate parameter for the digital component indicates that the digital component is a candidate for selection, (ii) the winning tier parameter indicates that the given digital component is included in the winning tier, and (iii) the second selection value parameter that indicates that the selection value for the digital component might be second highest selection value among a set of candidate digital components.

8. A system comprising:
    a first server comprising one or more processors; and
    one or more storage devices storing instructions that, when executed by the one or more processors, cause the one or more processors to perform operations comprising:
        receiving, by the first server of a secure multi-party computation (MPC) system and from a client device, a digital component request;
        identifying, for each digital component in a set of digital components, a selection value for the digital component and a priority tier for the digital component;
        identifying a selection value floor established by a publisher of an electronic resource for which the digital component request was received;
        filtering, from the set of digital components, one or more digital components having a selection value that is less than the selection value floor;
        for each of a plurality of priority tiers:
            determining, using a secure MPC process in collaboration with one or more second servers of the secure MPC system, a first secret share of a winner parameter for each digital component in the priority tier, comprising:
                determining, for each digital component in the priority tier, a first secret share of a candidate parameter that indicates whether the digital component is a candidate for selection; and
                determining the first secret share of the winner parameter for each digital component in the priority tier based on (i) the first secret share of a value of the candidate parameter for each digital component in the priority tier, (ii) one or more second secret shares of the candidate parameter for each digital component in the priority tier, and the selection value for each digital component in the priority tier;
        identifying a highest priority tier of the plurality of priority tiers for which a given digital component of the set of digital components has a winner parameter that indicates that the given digital component is a winning digital component for the tier; and
        generating a first secret share of a selection result identifying the given digital component; and
        providing the first secret share of the selection result to the client device.

9. The system of claim 8, wherein determining, using the secure MPC process in collaboration with one or more second servers of the secure MPC system, the first secret share of the winner parameter for each digital component in the priority tier comprises determining the first secret share of the winner parameter for each digital component in each priority tier in parallel.

10. The system of claim 8, wherein determining, using the secure MPC process in collaboration with one or more second servers of the secure MPC system, the first secret share of the winner parameter for each digital component in the priority tier comprises determining the first secret share of the winner parameter for each digital component in each priority tier in a sequence from a highest priority tier to a lowest priority tier.

11. The system of claim 8, wherein determining, for each digital component in the priority tier, a first secret share of a candidate parameter that indicates whether the digital component is a candidate for selection comprises determining, in collaboration with each of the one or more second servers, the first secret share of the candidate parameter for a particular digital component based on secret shares for one or more conditions for the particular digital component.

12. The system of claim 8, wherein identifying, for each digital component in the set of digital components, the selection value for the digital component comprises:
- identifying, for a given content platform, a boost established by a publisher of an electronic resource for which the digital component request was received or a content platform for the publisher; and
- adjusting the selection value for each digital component of the content platform using the boost.

13. The system of claim 8, wherein determining a secret share of the winner parameter for each digital component in the priority tier comprises:
- ordering the digital components in the priority tier based on the selection value for each digital component in the priority tier;
- determining, a first secret share of an accumulated value for each digital component in the tier based at least on the order and the first secret share of the candidate parameter for each digital component in the priority tier, wherein the accumulated value for a digital component indicates a quantity of candidate digital components in the priority tier having a higher selection value than the digital component; and
- for each digital component in the priority tier, determining the first secret share of the winner parameter for the digital component based on the first secret share of the candidate parameter for the digital component, each of the one or more second secret shares of the candidate parameter for the digital component, and the accumulated value for the digital component.

14. The system of claim 13, wherein the operations comprise determining a second selection value corresponding to a second value selection process, comprising:
- determining, for each priority tier, a first secret share of a winning tier parameter that represents whether the given digital component is included in the priority tier;
- determining, for each digital component in the set of digital components, a first secret share of a second selection value parameter that represents whether the selection value for the digital component might be second highest selection value among a set of candidate digital components; and
- identifying, as the second selection value, a selection value for a digital component for which (i) the candidate parameter for the digital component indicates that the digital component is a candidate for selection, (ii) the winning tier parameter indicates that the given digital component is included in the winning tier, and (iii) the second selection value parameter that indicates that the selection value for the digital component might be second highest selection value among a set of candidate digital components.

15. A non-transitory computer readable storage medium carrying instructions that, when executed by one or more processors of a first server, cause the one or more processors to perform operations comprising:
- receiving, by a first server of a secure multi-party computation (MPC) system and from a client device, a digital component request;
- identifying, for each digital component in a set of digital components, a selection value for the digital component and a priority tier for the digital component;
- identifying a selection value floor established by a publisher of an electronic resource for which the digital component request was received;
- filtering, from the set of digital components, one or more digital components having a selection value that is less than the selection value floor;
- for each of a plurality of priority tiers:
  - determining, using a secure MPC process in collaboration with one or more second servers of the secure MPC system, a first secret share of a winner parameter for each digital component in the priority tier, comprising:
    - determining, for each digital component in the priority tier, a first secret share of a candidate parameter that indicates whether the digital component is a candidate for selection; and
    - determining the first secret share of the winner parameter for each digital component in the priority tier based on (i) the first secret share of a value of the candidate parameter for each digital component in the priority tier, (ii) one or more second secret shares of the candidate parameter for each digital component in the priority tier, and the selection value for each digital component in the priority tier;
- identifying a highest priority tier of the plurality of priority tiers for which a given digital component of the set of digital components has a winner parameter that indicates that the given digital component is a winning digital component for the tier; and
- generating a first secret share of a selection result identifying the given digital component; and
- providing the first secret share of the selection result to the client device.

16. The non-transitory computer readable storage medium of claim 15, wherein determining, using the secure MPC process in collaboration with one or more second servers of the secure MPC system, the first secret share of the winner parameter for each digital component in the priority tier comprises determining the first secret share of the winner parameter for each digital component in each priority tier in parallel.

17. The non-transitory computer readable storage medium of claim 15, wherein determining, using the secure MPC process in collaboration with one or more second servers of the secure MPC system, the first secret share of the winner parameter for each digital component in the priority tier comprises determining the first secret share of the winner parameter for each digital component in each priority tier in a sequence from a highest priority tier to a lowest priority tier.

18. The non-transitory computer readable storage medium of claim 15, wherein determining, for each digital component in the priority tier, a first secret share of a candidate parameter that indicates whether the digital component is a candidate for selection comprises determining, in collaboration with each of the one or more second servers, the first secret share of the candidate parameter for a particular digital component based on secret shares for one or more conditions for the particular digital component.

19. The non-transitory computer readable storage medium of claim 15, wherein identifying, for each digital component in the set of digital components, the selection value for the digital component comprises:
  identifying, for a given content platform, a boost established by a publisher of an electronic resource for which the digital component request was received or a content platform for the publisher; and
  adjusting the selection value for each digital component of the content platform using the boost.

20. The non-transitory computer readable storage medium of claim 15, wherein determining a secret share of the winner parameter for each digital component in the priority tier comprises:
  ordering the digital components in the priority tier based on the selection value for each digital component in the priority tier;
  determining, a first secret share of an accumulated value for each digital component in the tier based at least on the order and the first secret share of the candidate parameter for each digital component in the priority tier, wherein the accumulated value for a digital component indicates a quantity of candidate digital components in the priority tier having a higher selection value than the digital component; and
  for each digital component in the priority tier, determining the first secret share of the winner parameter for the digital component based on the first secret share of the candidate parameter for the digital component, each of the one or more second secret shares of the candidate parameter for the digital component, and the accumulated value for the digital component.

* * * * *